United States Patent
Nakatsugawa et al.

(10) Patent No.: US 7,512,093 B2
(45) Date of Patent: Mar. 31, 2009

(54) QOS SETUP METHOD AND QOS SETUP SYSTEM FOR USE IN MOBILE COMMUNICATION, AND MOBILE TERMINAL APPARATUS, HOME AGENT AND SERVER APPARATUS USED FOR THE QOS SETUP SYSTEM

(75) Inventors: Keiichi Nakatsugawa, Kawasaki (JP); Ryuuichi Takechi, Kawasaki (JP); Akiko Yamada, Kawasaki (JP)

(73) Assignee: Fujitsu Limited, Nakahara-Ku, Kawasaki-Shi, Kanagawa (JP)

( * ) Notice: Subject to any disclaimer, the term of this patent is extended or adjusted under 35 U.S.C. 154(b) by 505 days.

(21) Appl. No.: 11/205,429

(22) Filed: Aug. 17, 2005

(65) Prior Publication Data
US 2006/0215599 A1    Sep. 28, 2006

(30) Foreign Application Priority Data
Mar. 16, 2005    (JP) .............................. 2005-076063

(51) Int. Cl.
*H04Q 7/24* (2006.01)
(52) U.S. Cl. ...................................... 370/328; 370/331
(58) Field of Classification Search ....................... None
See application file for complete search history.

(56) References Cited

U.S. PATENT DOCUMENTS 7,006,472 B1 *    2/2006    Immonen et al. ............ 370/332
2006/0114855 A1 *    6/2006    Zheng ........................ 370/331

FOREIGN PATENT DOCUMENTS

| JP | 2003-521137 | 7/2003 |
| WO | WO 00/64121 | 10/2000 |

\* cited by examiner

*Primary Examiner*—Erika A Gary
(74) *Attorney, Agent, or Firm*—Fujitsu Patent Center

(57) ABSTRACT

A QoS setup method comprises the steps of a mobile node MN recognizing a first QoS setup request when an opposite correspondent node CN makes the first QoS setup request for its route to the home address HoA of the mobile node MN, the mobile node MN making a second QoS setup request, and establishing the second QoS setup for a route between the home address HoA and Care-of Address CoA of the mobile node MN. This method makes it possible to carry out QoS setup for a section to a moved-to place of a mobile node MN in response to a QoS setup request from an opposite correspondent node CN, even if the correspondent node CN and mobile node do not have a function of route optimization.

18 Claims, 34 Drawing Sheets

| IP HEADER |
|---|
| - VERSION, HEADER LENGTH
- TYPE OF SERVICE, PACKET LENGTH
- IDENTIFIER (ID), OFFSET
- TIME TO LIVE (TTL), PROTOCOL, HEADER CHECKSUM
- TRANSMITTER ADDRESS, ADDRESSEE ADDRESS |

| TRANSPORT HEADER (UDP) |
|---|
| - TRANSMITTER PORT NUMBER, ADDRESSEE PORT NUMBER
- PAYLOAD LENGTH, CHECKSUM |

| RSVP MESSAGE |
|---|
| [COMMON HEADER]
- MESSAGE TYPE, CHECKSUM
- TIME TO LIVE (TTL) MESSAGE LENGTH
[OBJECT]
- SESSION CLASS
  - ADDRESSEE IP ADDRESS, PROTOCOL, ADDRESSEE PORT NUMBER
- FLOW SPEC (QoS SETUP INFORMATION)
  - BAND |

FIG. 12

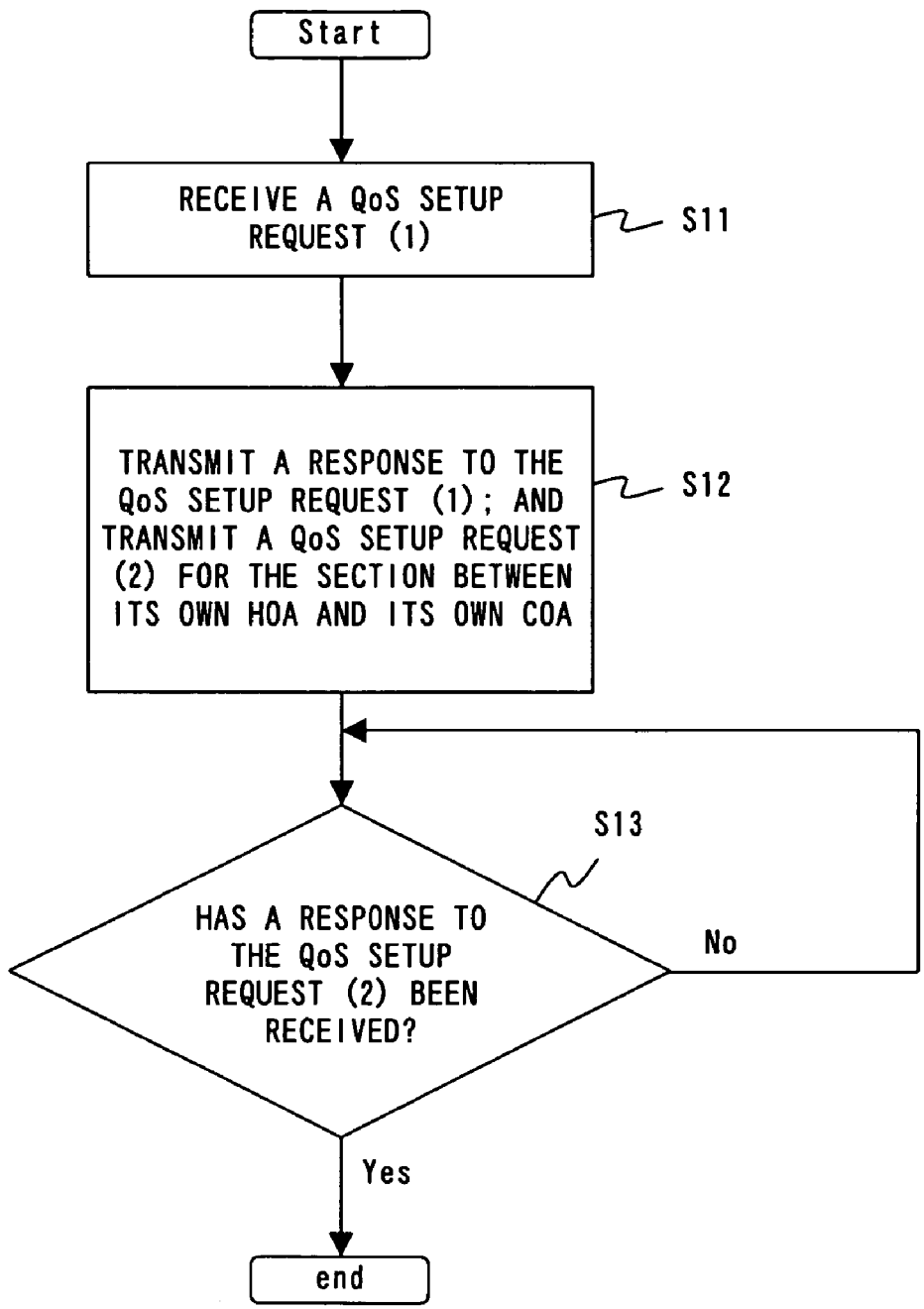
F I G. 1 6

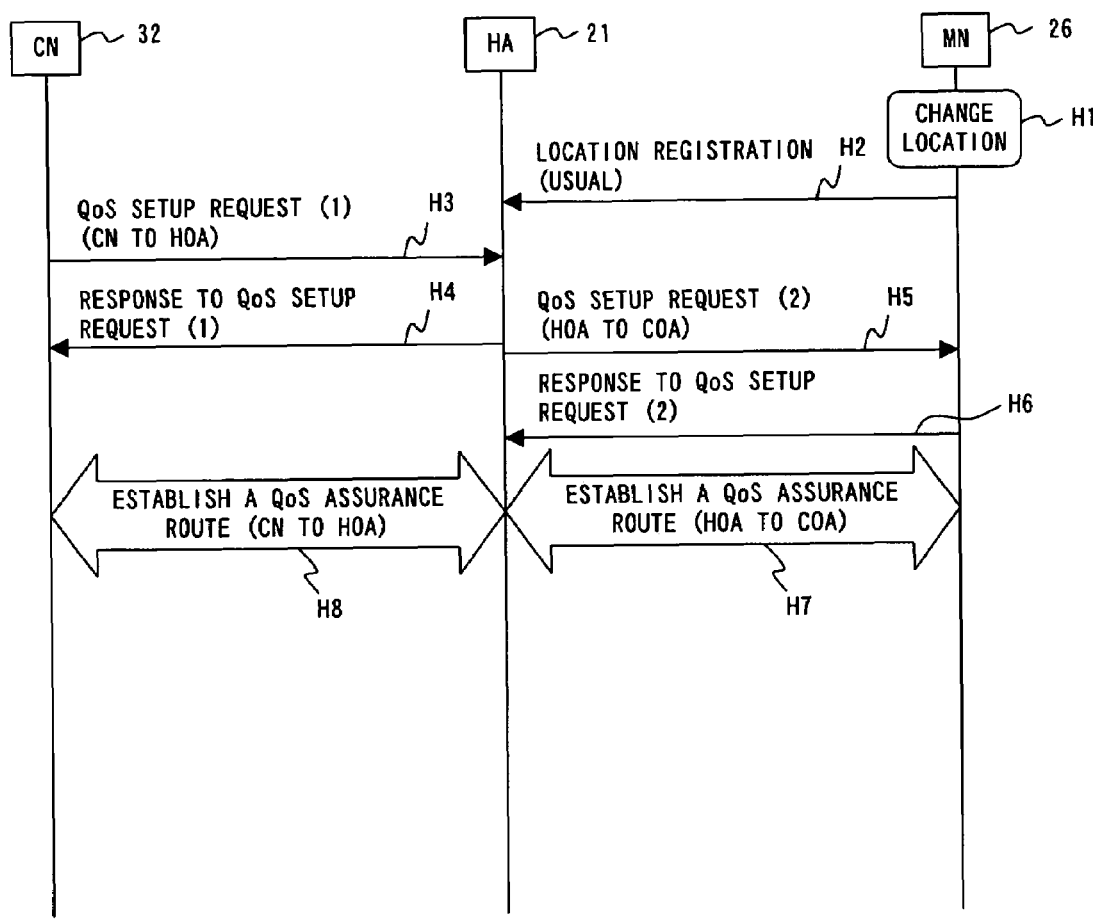
F I G. 19

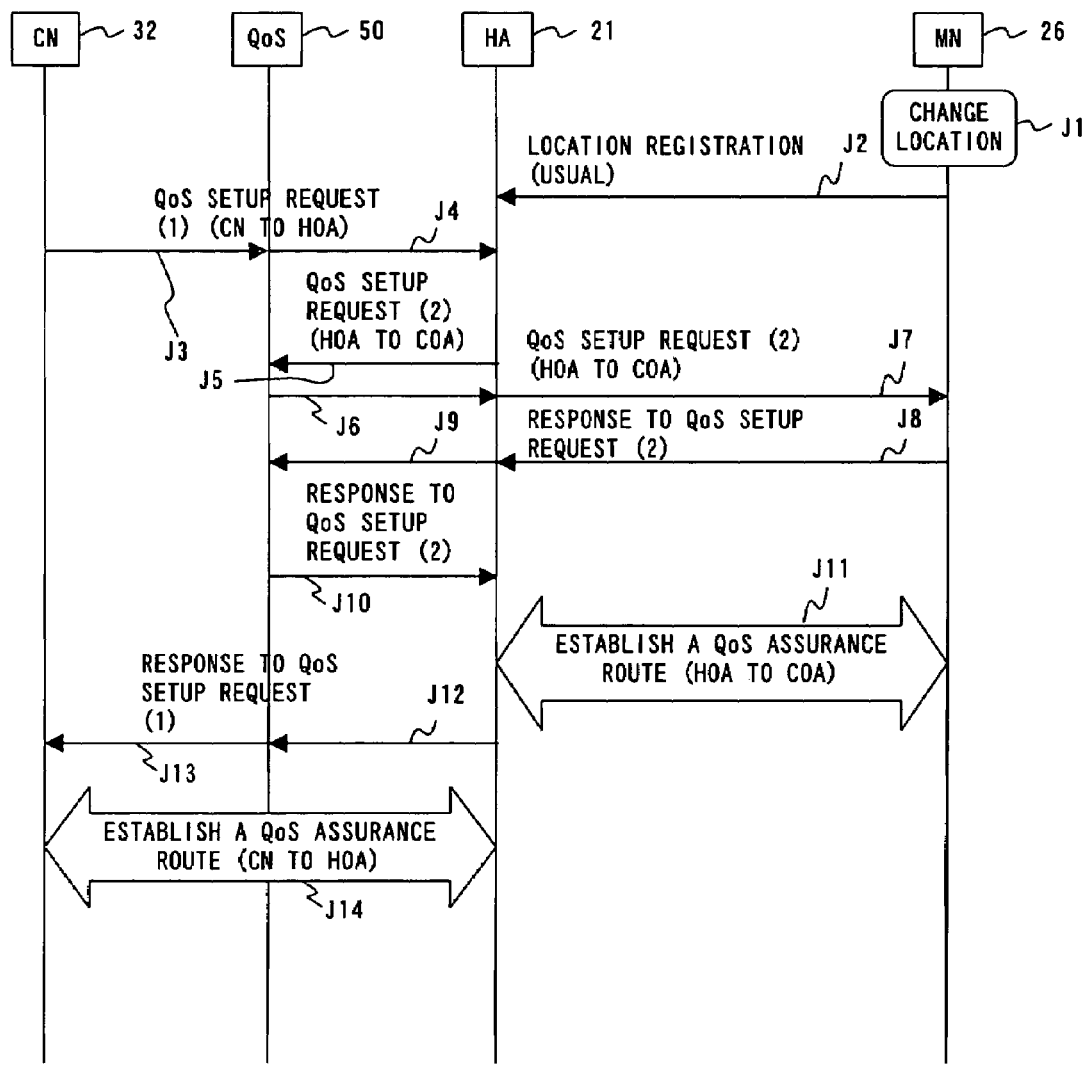
F I G. 20

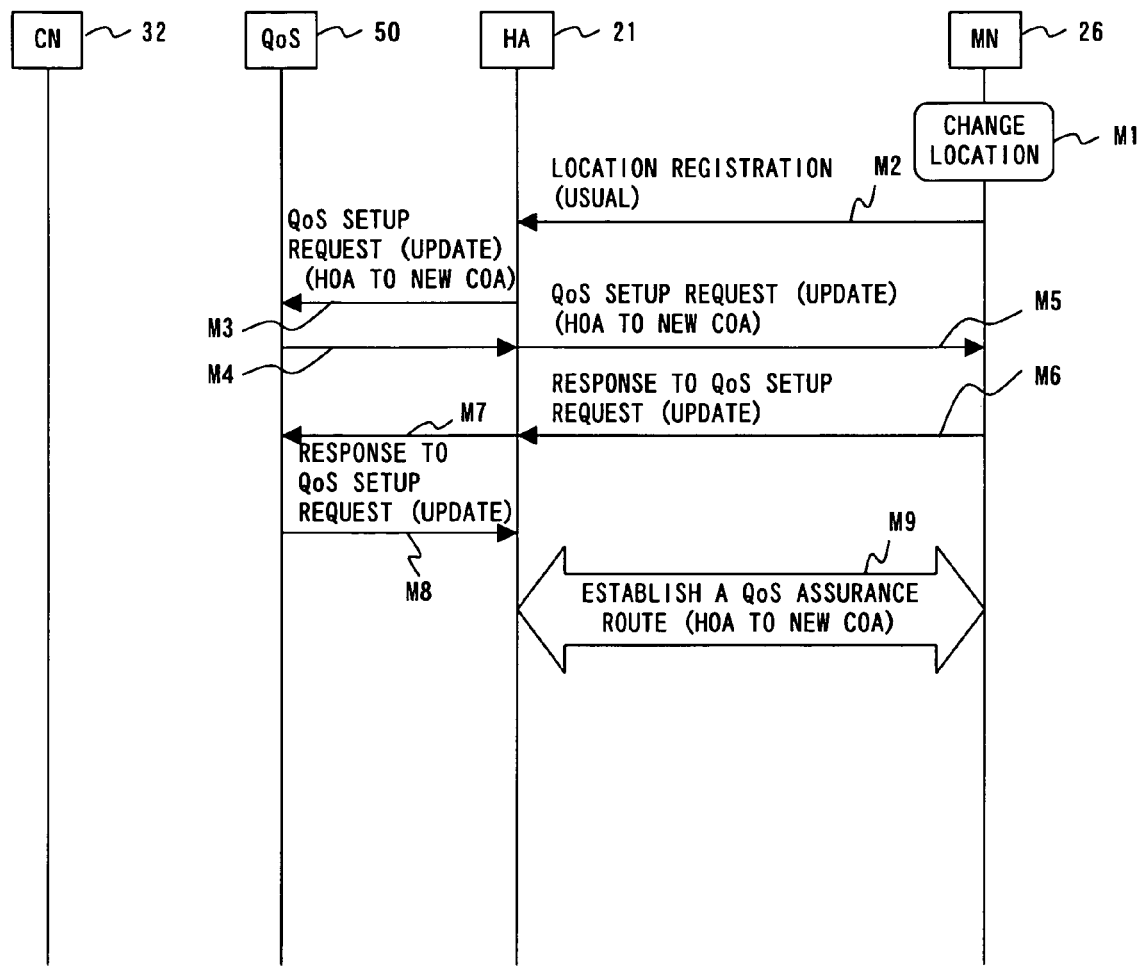
F I G. 23

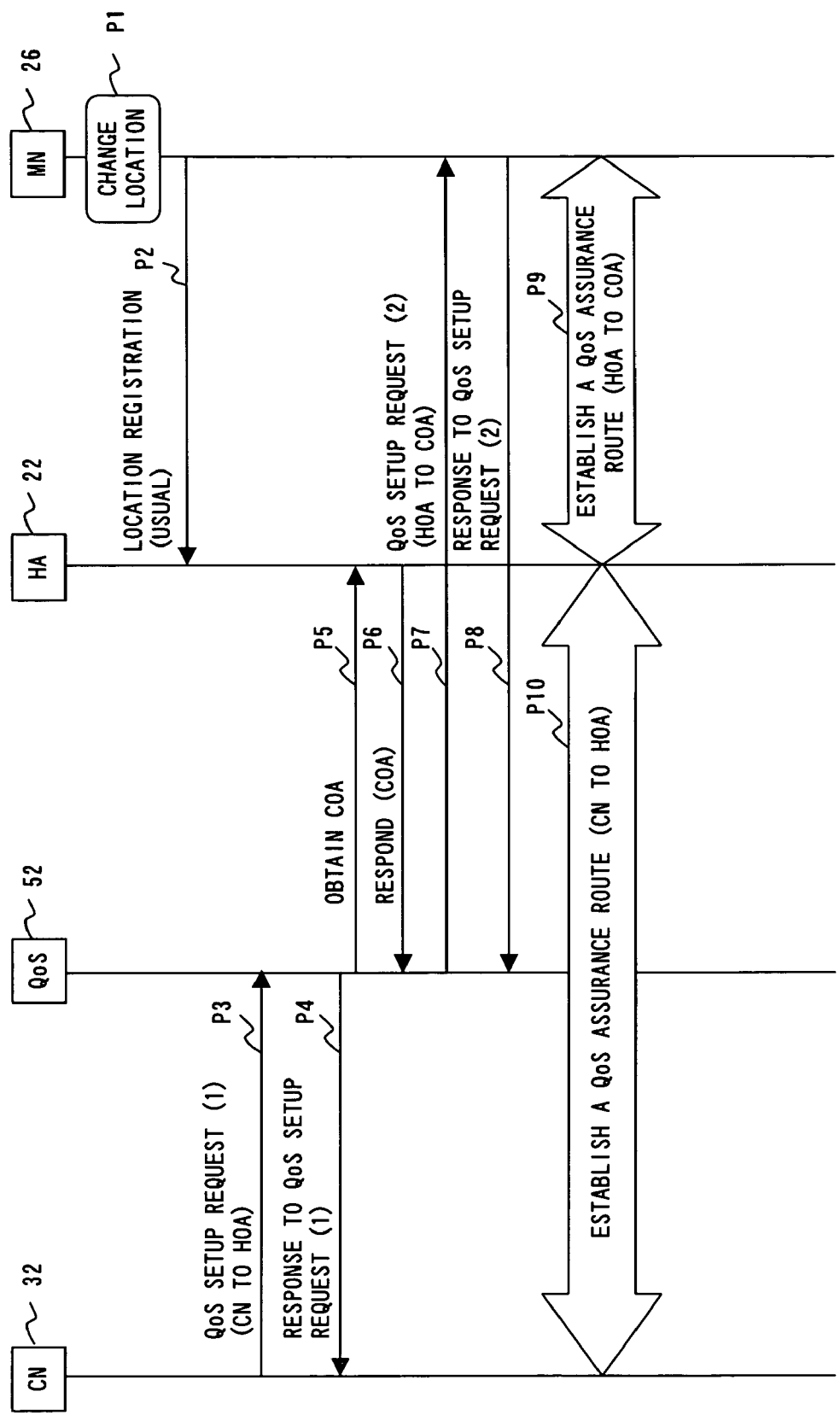
F I G. 29

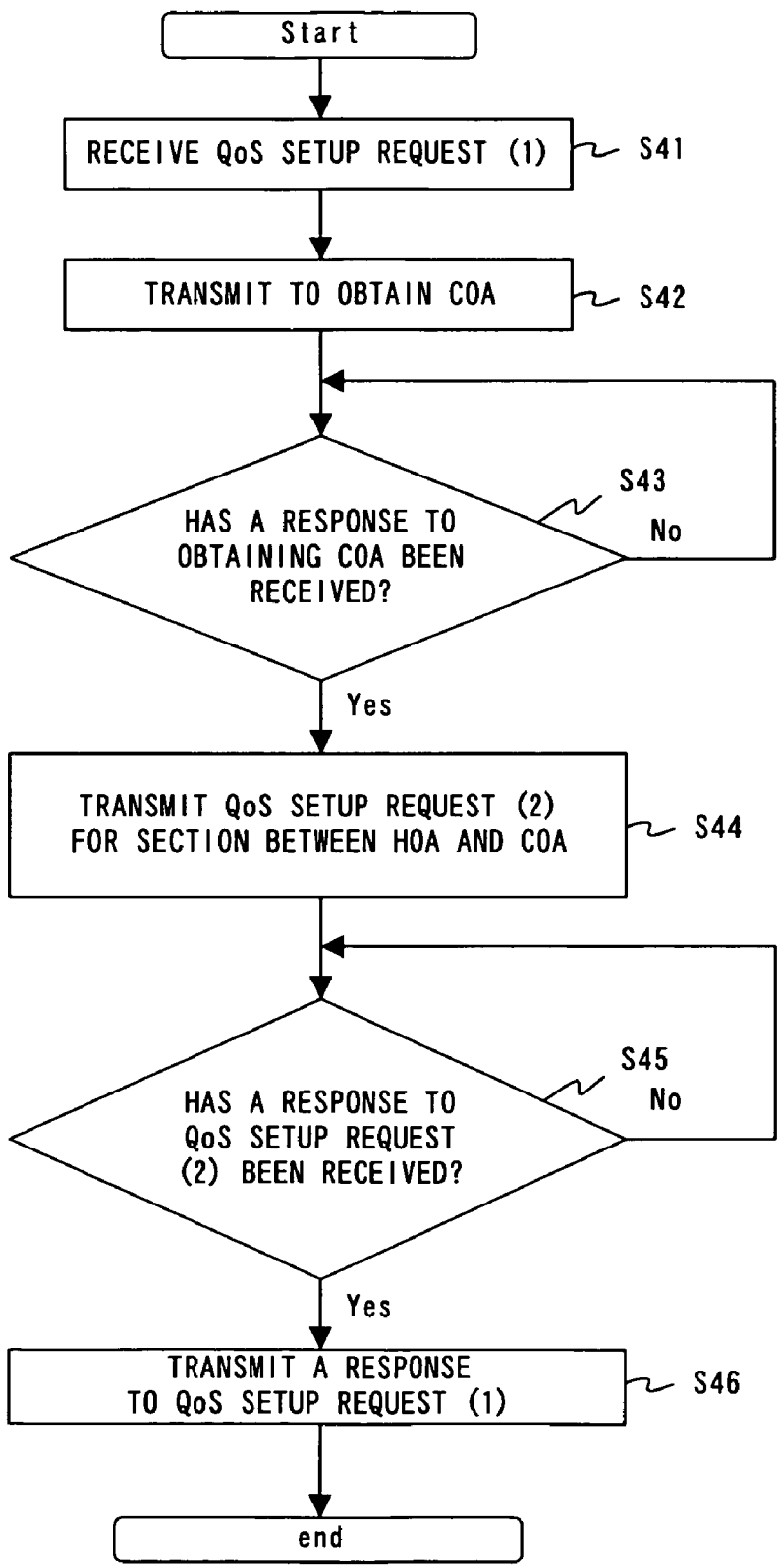
F I G. 33

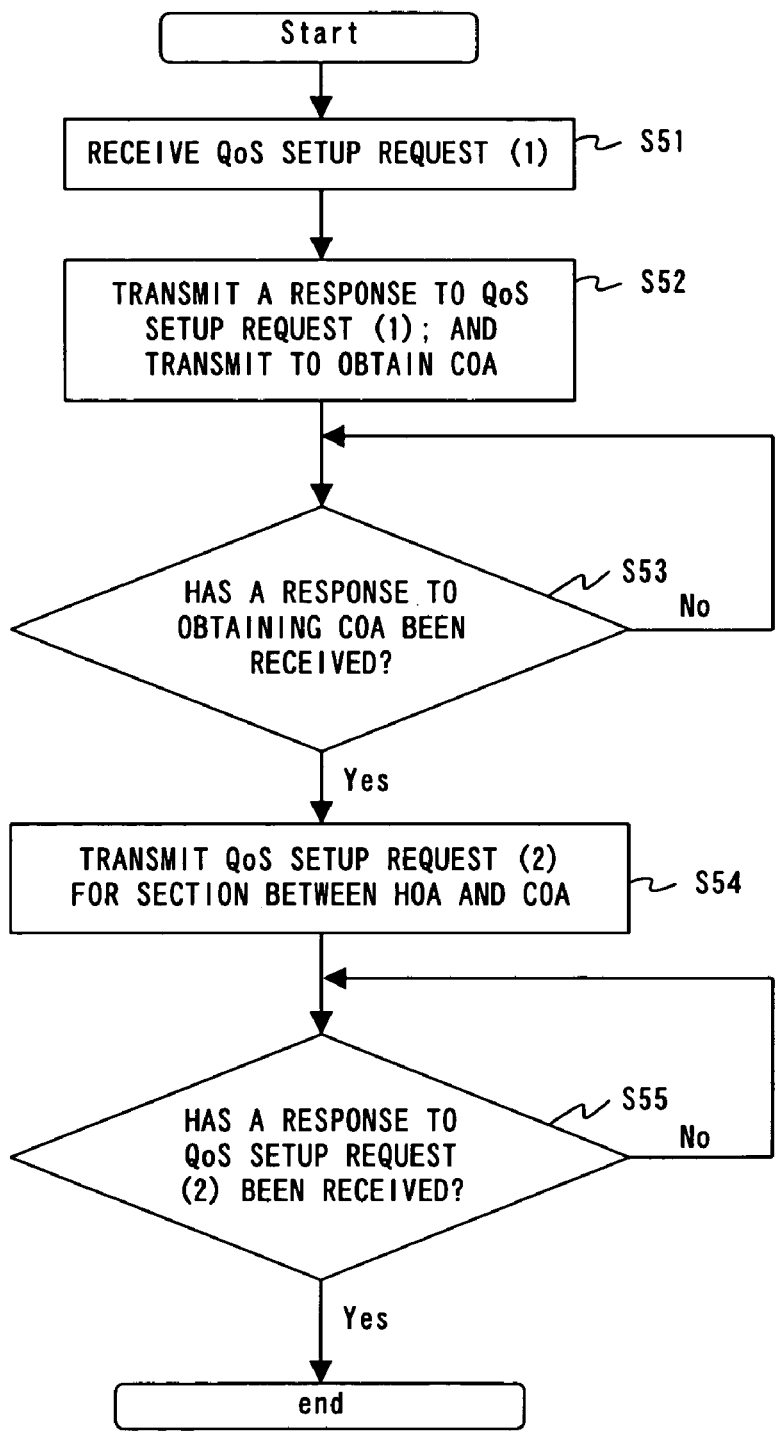
F I G. 3 4

US 7,512,093 B2

QOS SETUP METHOD AND QOS SETUP SYSTEM FOR USE IN MOBILE COMMUNICATION, AND MOBILE TERMINAL APPARATUS, HOME AGENT AND SERVER APPARATUS USED FOR THE QOS SETUP SYSTEM

CROSS REFERENCE TO RELATED APPLICATION

This application is based upon and claims the benefit of priority of Japanese Patent Application No. 2005-076063, filed on Mar. 16, 2005, the entire contents of which are incorporated herein by reference.

BACKGROUND OF THE INVENTION

1. Field of the Invention

The present invention relates to a QoS (Quality of Service) setup technique for a mobile communication, and in particular to a QoS setup method and QoS setup system provided for a mobile node on the move (to be called a MN (mobile node) herein, unless otherwise noted), and a mobile terminal apparatus, home agent and server apparatus used for the aforementioned system.

2. Description of the Related Art

Mobile IP is a protocol (refer to: http://ietf.org.org/internet-drafts/draft-ietf-mip4-rfc3344bis-01.txt) for accomplishing mobility on an IP (Internet protocol) network, and a MN (mobile node) registers with a HA (home agent) a correlation between a HoA (home address) which is assigned permanently and CoA (care of address) which is temporarily utilized at a visiting place. A packet transmitted by a CN (correspondent node), which is an opposite correspondent, to the HoA of a MN is received by a HA as proxy which then tunnels it to the CoA of the MN, thereby enabling the MN to communicate with the CN even at a visiting place.

For mobile IP, a function called route optimization is also defined. Route optimization requires the functions of mobile IP and route optimization not only for the MN and HA, but also for the CN which is an opposite correspondent. The MN registers a CoA not only at the HA but also at the CN which is an opposite correspondent, and the CN tunnels by itself addressed to the CoA of the MN. This causes a packet to transmit itself to the MN via a direct route instead of going by way of the HA.

Incidentally, mobile IP has two protocol definitions, i.e., IP v4 (Internet Protocol version 4; refer to: http://www.ietf.org/rfc/rfc2002.txt) and IP v6 (Internet Protocol version 6; refer to: http://www.ietf.org/rfc/rfc3775.txt), both of which are the same in terms of basic operation. The present invention does not differentiate between mobile IP v4 and mobile IP v6 in the description herein.

In the meantime, a QoS setup has conventionally been carried out for a network applied by a mobile IP as follows. That is, a reservation for a network resource or a request for priority processing at the start of communications to assure characteristics such as band and delay, thereby trying to satisfy a QoS for the communication.

Accordingly, the known protocols for setting such QoS include: RSVP (Resource Reservation Protocol; refer to: http://www.ietf.org/rfc/rfc2205.txt), NSIS (Next Step In Signaling; refer to: http://www.ietf.org/internet-drafts/draft-ietf-nsis-fw-07.txt) (NB NSIS is a framework for signaling which comprises a GIMPS (General Internet Messaging Protocol for Signaling; refer to: http://www.ietf.org/internet-drafts/draft-ietf-nsis-ntlp-04.txt) and NSLP (NSIS Signaling Layer Protocol; (refer to: http://www.ietf.org/internet-drafts/draft-ietf-nsis-qos-nslp-05.txt) for Quality of Service signaling).

For the NSIS specifically, the proposed are not only a method in which a reservation message for a QoS setup follows the same route as data (i.e., On-Path Signaling) but also a method in which a reservation message is sent to a QoS node (i.e., a dedicated server) which then carries out a series of settings for necessary nodes within the network (i.e., Off-Path Signaling).

Meanwhile, prepared as mechanisms for assuring a QoS include packet priority control for a router and MPLS (Multi Protocol LABEL Switching; refer to: http://www.ietf.org/rfc/rfc3031.txt).

The present invention is configured to be usable without specifying any of the above described protocols, signaling methods or assurance mechanisms used for a QoS setup.

FIG. 1 describes a conventional QoS setup method premised on route optimization for a mobile communication system. The mobile communication system shown by FIG. 1 comprises a home network 120 including a mobile node MN 124 and a home agent HA 122, and an IP network 110 including a plurality of routers 142 through 146. Mobile communication between the mobile node MN 124 and a correspondent terminal CN 130 is carried out via a direct route. Note that the description herein is based on the assumption regarding connections, i.e., the CN 130 to a first router 142, the HA 122 to a second router 144, and the MN 124 to a third router 146, respectively.

Meanwhile, FIG. 2 describes a conventional QoS setup sequence for the configuration shown by FIG. 1. Referring to FIGS. 1 and 2, for a mobile node MN 124 with a route optimization function, if the mobile node MN 124 moves away from the home network 120, where it originally belongs, to a zone controlled by the third router 146 located within the IP network 110 through mobile IP (step T1), it first puts a position registration on record at the home agent HA 122 as usual (step T2) In this event, the mobile node MN 124 comes to possess a home address HoA and a care of address CoA according to mobile IP. And the mobile node MN 124 puts a position registration on record at the opposite correspondent terminal CN 130 having a route optimization function in order to carry out a route optimization therewith, and register the care of address CoA (step T3).

The opposite correspondent terminal CN 130 having a route optimization function sends the care of address CoA of the mobile terminal MN 124 having a route optimization function a QoS setup request (step T4). The mobile terminal MN 124 returns a response to the QoS setup request back to the opposite correspondent terminal CN 130 (step T5). As a result, a direct QoS setup is carried out between the mobile terminal MN 124 and opposite correspondent terminal CN 130, thereby establishing a QoS assurance route (step T6).

Such a QoS setup method is disclosed by a patent document 1, et cetera, hence is known to the entity of the present invention as a known technique. In the conventional QoS setup method, however, a QoS is assured for the MN and CN only through the direct route between the aforementioned two nodes and not via the HA, which has created an excessive use of network resources, such as putting a location registration on record at the CN having a route optimization function for the purpose of route optimization every time a MN with a route optimization function changes its location.

But the fact is that the majority of CNs are ordinary terminal with no mobile IP or route optimization functions, which means that most CNs are not capable of storing the CoA of the MN. If a CN is desired to be applicable to mobile IP and route optimization, all the terminals that might possibly become opposite correspondents with the MN must be modified as such, requiring an impractical amount of money and time.

FIG. 3 describes issues in a QoS setup relating to a conventional mobile communication in which route optimization is unavailable. The mobile communication system shown by FIG. 3 comprises a home network 120 including a mobile node MN 126 and a home agent 122, and an IP network 110 including a plurality of routers 142 through 146. And mobile communication between the mobile node 126 and an opposite correspondent terminal CN 132 is available only through a route via the home agent 122. Note that the description herein is based on the assumption regarding connections, i.e., the CN 132 to a first router 142, the home agent HA 122 to a second router 144, and the MN 126 to a third router 146, respectively.

FIG. 4 describes a conventional QoS setup sequence for the system shown by FIG. 3. Referring to FIGS. 3 and 4, a mobile node MN 126 without a route optimization function, if the mobile node MN 126 moves away from the home network 120, where it originally belongs, to a zone watched over by a third router 146 located within the IP network 110 through a mobile IP (step U1), first puts a position registration on record at the home agent HA 122 as usual (step U2). In this event, the mobile node MN 126, even without a route optimization function can possess a home address HoA and a care of address CoA according to the mobile IP, but a mobile node MN 126 without a route optimization function cannot register a care of address CoA at the opposite correspondent terminal CN 132 without a route optimization function.

As the opposite correspondent terminal CN 132 without a route optimization function sends a QoS setup request to the home address HoA of the mobile terminal MN 126, the QoS setup request is received by the home agent HA 122 (step U3). The home agent HA 122 transfers the QoS setup request to mobile terminal MN 125 (step U4) which receives the transferred QoS setup request, returns a response to the QoS request back to the home agent HA 122 (step U5) and further returns a response to the QoS setup request back to the opposite correspondent terminal CN 132 (step U6). As a result, a QoS assurance route is established between the opposite correspondent terminal CN 132 and home agent HA 122 (step U7).

Although the QoS setup method provides a QoS assurance between the CN and HA, there has been an issue of a QoS between the HA and MN not being assured. That is, the route which is set for a QoS is only from the CN 132 to the HoA of the MN 126, leaving the segment between the HoA and CoA at a visiting place of the MN 126 not being set for a QoS conventionally. Note that the situation will be the same if the CN which is an opposite correspondent terminal is a mobile terminal, just like the MN, if the CN which is an opposite correspondent terminal has no route optimization function.

[Patent document 1] Japanese translation of PCT international patent application publication No. 2003-521137

SUMMARY OF THE INVENTION

In order to solve the above described issues, the purpose of the present invention is to provide a QoS setup method and QoS setup system capable of carrying out a QoS setup for a mobile node MN for a section to a place where the mobile node MN has moved to (simply "moved-to" place hereinafter) in response to a QoS setup request from an opposite correspondent CN even without a function of route optimization, and a mobile terminal apparatus, home agent and server apparatus for use in the aforementioned system.

In order to solve the above described issues, the present invention is characterized by a mobile node recognizing a first QoS setup request, the mobile node making a second QoS setup request, and carrying out the second QoS setup for a route between a home address and a Care-of Address of the mobile node when the first request is made for a QoS setup for a route between an opposite correspondent node and a home address of the mobile node.

According to the present invention, in all cases only one position registration message is required to a home agent HA which manages a home address of a mobile node even if the number of communicating opposite correspondents CN increases, hence rendering the benefits of saving network resources and reducing the processing time greatly.

Also according to the present invention, a mobile node MN is only required to update the QoS setup for the route between the home agent HA and CoA for the mobile node independent of the number of opposite correspondent nodes CN, while not required to update the QoS setup for the route between all the communicating opposite correspondents and the home agent HA, thereby rendering the benefits of reducing the load and shortening the switching time in switching processing on moving.

BRIEF DESCRIPTION OF THE DRAWINGS

FIG. 12 shows the structure of a message relating to a second QoS setup request using RSVP;

FIG. 16 is a flow chart for the MN shown by FIG. 14 carrying out the sequences shown by FIGS. 7 and 9;

FIG. 19 describes a sequence for a second working example of a QoS setup method according to the second embodiment of the present invention;

FIG. 20 describes a sequence for a third working example of a QoS setup method according to the second embodiment of the present invention;

FIG. 23 describes a sequence at the time of handover according to the third and fourth working examples shown by FIGS. 20 and 21, respectively;

FIG. 29 describes a sequence for a second working example of a QoS setup method according to the third embodiment of the present invention;

FIG. 33 is a flow chart for the QoS setup node shown by FIG. 32 carrying out the sequence shown by FIG. 28; and FIG. 34 is a flow chart for the QoS setup node shown by FIG. 32 carrying out the sequence shown by FIG. 29.

DESCRIPTION OF THE PREFERRED EMBODIMENTS

The following is a detailed description of the preferred embodiment of the present invention while referring to the accompanying drawings.

First Embodiment

Figure 5:
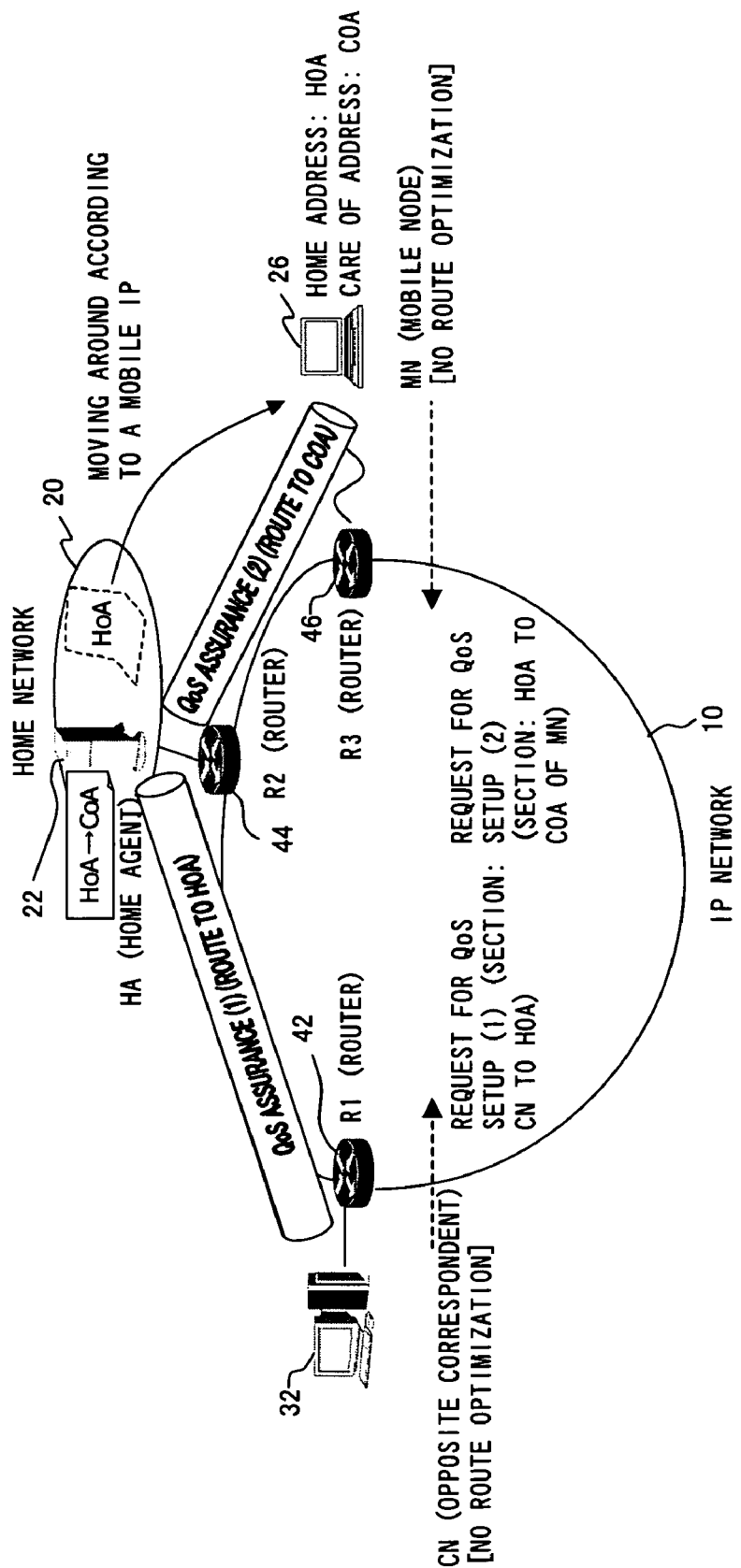
FIG. 5 describes a QoS setup method for a mobile communication system according to a first embodiment of the present invention.

FIG. 5 describes a QoS setup method for a mobile communication system according to a first embodiment of the present invention. The mobile communication system shown by FIG. 5 comprises a home network 20 including a mobile node MN (i.e., mobile terminal) 26 and home agent HA 22, and an IP network 10 including a plurality of routers 42 through 46. And mobile communication between the mobile node MN 26 and opposite correspondent terminal CN (correspondent node) 32 is enabled by a first route connecting the opposite correspondent terminal CN 32 with the home agent HA 22 by the HoA (home address) of the mobile node MN 26, and a second route connecting the home agent HA 22 with the mobile node MN 26 by the CoA (care of address) thereof. Note that the description herein is based on the following assumption regarding connections, i.e., the CN 32 to a first router 42, the home agent HA 22 to a second router 44, and the MN 26 to a third router 46, respectively.

And the QoS setup method according to the first embodiment of the present invention comprises the steps of the MN 26 recognizing a first QoS setup request when an opposite correspondent CN 32 makes the first QoS setup request for a route to the HoA of the mobile node MN 26, and making a second QoS setup request for the route between the HoA and CoA of the MN 26.

Note that the first and second QoS setups may be through on-path signaling, off-path signaling (NB QoS setup node is not shown in drawings herein), or any other signaling method.

Figure 6:
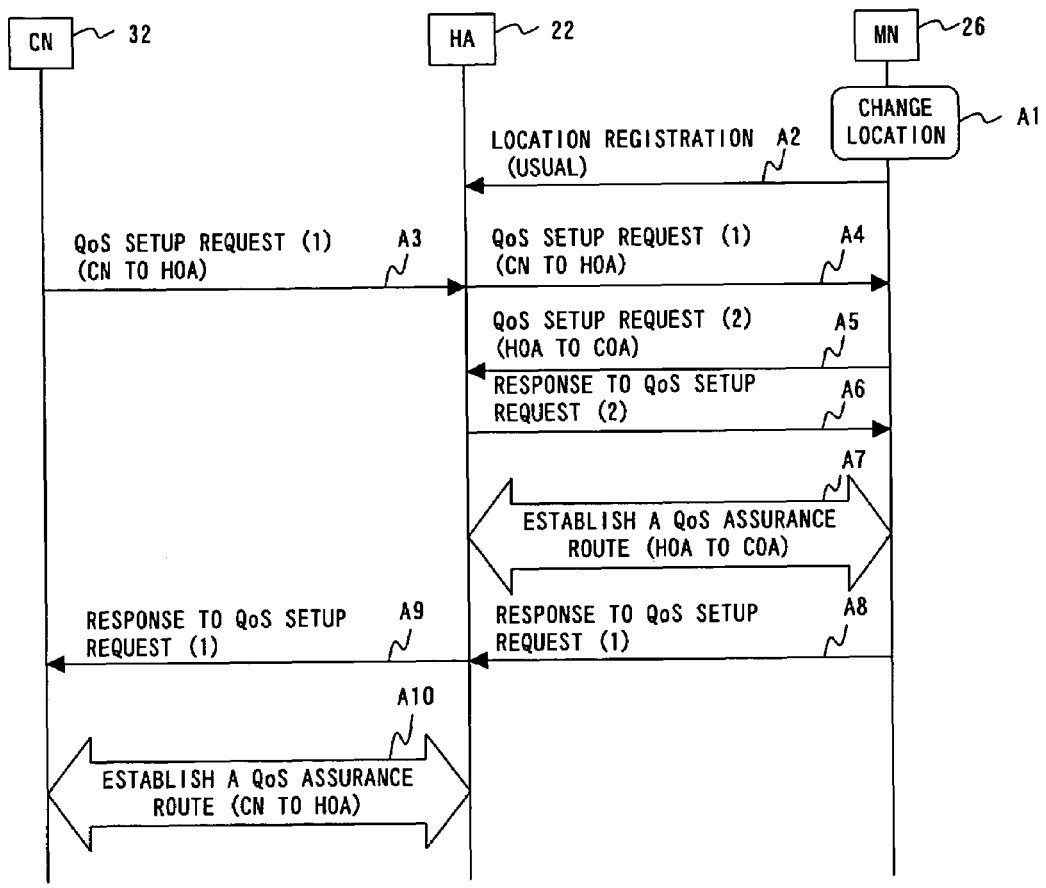
FIG. 6 describes a sequence for a first working example of QoS setup method according to the first embodiment of the present invention.

FIG. 6 describes a sequence for a first working example of QoS setup method according to the first embodiment of the present invention. This example is the case of using on-path signaling for a QoS setup, in which the MN 26, as it moves away from the home network (step A1) (simply "A1", "B1" and so on, hereinafter), puts a position registration on record at the HA 22 as usual (A2). A first QoS setup request (1) from the CN 32 is transferred to the HA 22 and received by the MN 26 (A3 and A4). The MN 26, before responding back to the first QoS setup request, makes a second QoS setup request (2) (A5) and at the same time receives the response thereto (A6) to establish a route with a QoS setup for the section between the HoA and CoA (A7). Subsequently, the MN 26 returns a response to the first QoS setup request (1) back to the HA 22 (A8) which then transfers it to the CN 32 (A9). This establishes a route with a QoS setup between the CN and HoA (A10), thereby enabling communication based on a QoS assurance between the CN 32 and MN 26.

Figure 7:
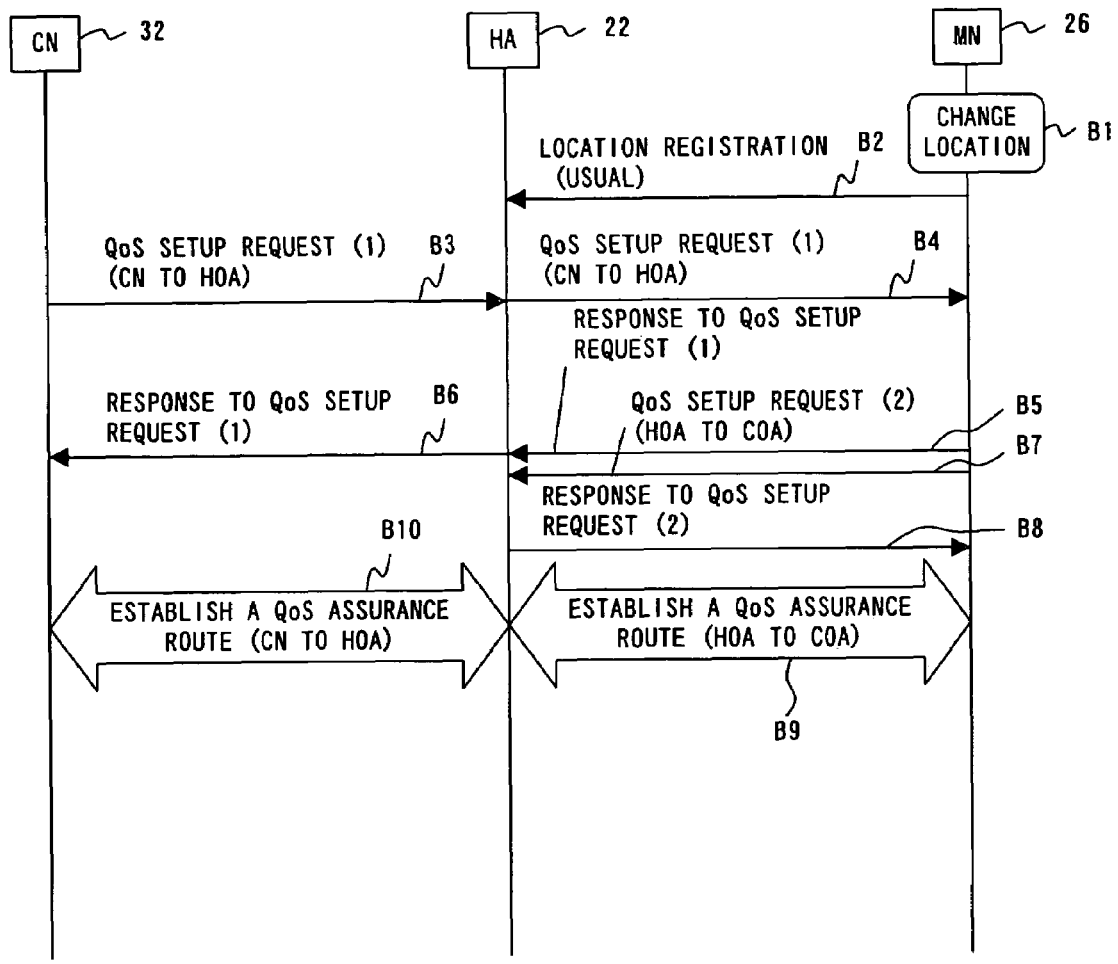
FIG. 7 describes a sequence for a second working example of QoS setup method according to the first embodiment of the present invention.

FIG. 7 describes a sequence for a second working example of QoS setup method according to the first embodiment of the present invention. The difference from the first example shown by FIG. 6 is that the MN 26 returns a response to the first QoS setup request (1) (B5) and, at approximately the same time, makes a second QoS setup request (2) (B7) to establish the route with a QoS setup between the HoA and CoA (B9). This makes it possible to start the second QoS setup request (2) earlier than in the case of the first example shown by FIG. 6, thereby shortening the time required for completing the first QoS setup request (1) and the second QoS setup request (2).

Incidentally, for FIGS. 6 and 7, in the case of using RSVP (resource reservation protocol) as a protocol for a QoS setup by using on-path signaling, a QoS setup request (1) and QoS setup request (2) become Resv messages according to the RSVP in which a response to the QoS setup request (1) or to the one about the QoS setup request (2) is not required since no response message is returned vis-à-vis a Resv message. Meanwhile, a path message will be transmitted prior to a Resv message although it is not shown in the drawings.

Figure 8:
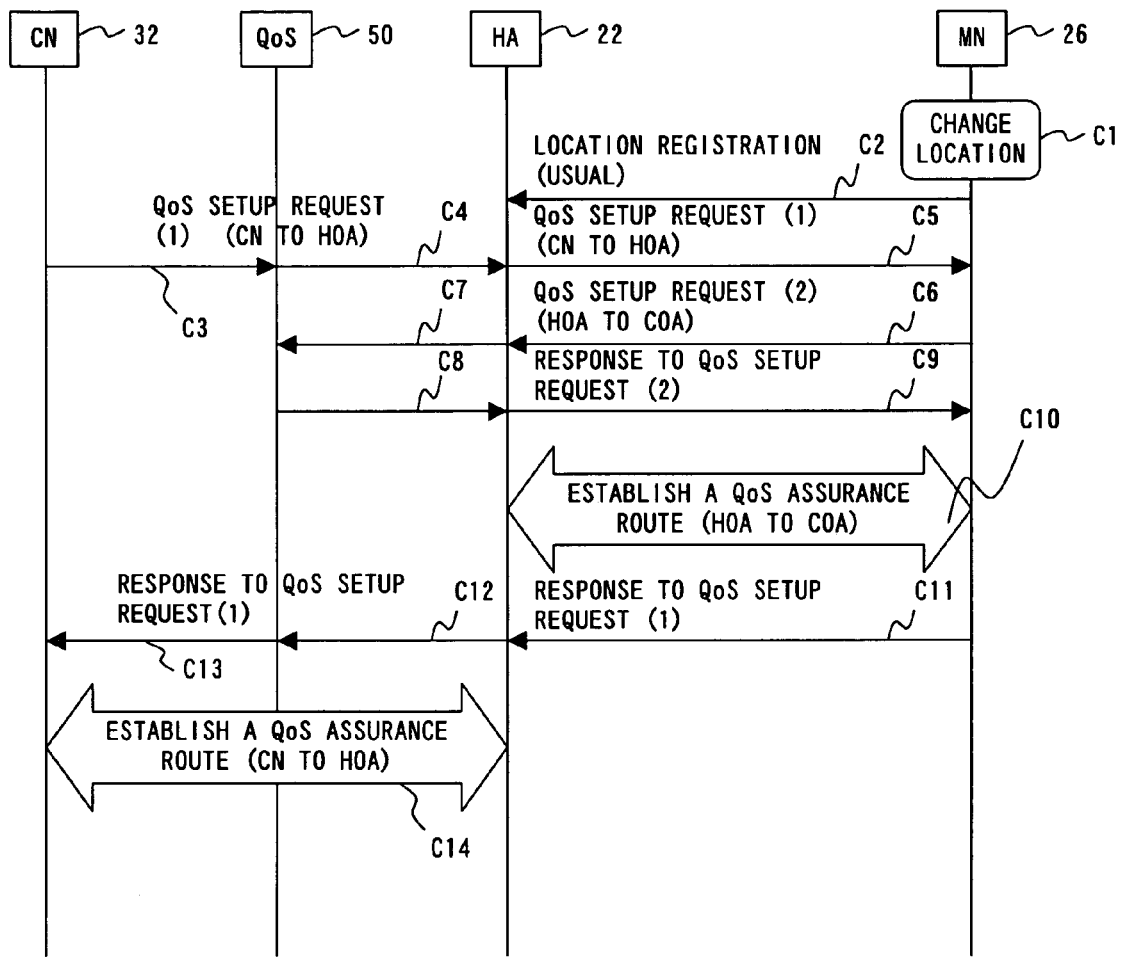
FIG. 8 describes a sequence for a third working example of QoS setup method according to the first embodiment of the present invention.

FIG. 8 describes a sequence for a third working example of a QoS setup method according to the first embodiment of the present invention. This example is the case of using off-path signaling for a QoS setup, in which the MN 26, as it moves away from the home network (C1), puts a position registration on record at the HA 22 as usual (C2). A first QoS setup request (1) from the CN 32 is received by a QoS setup server 50 (NB while FIG. 8 only shows one, an actual setup request may go through a plurality thereof) installed in a management unit of the network (NW) (C3). The QoS setup server 50 transmits the first QoS setup request (1) to the HA 22 (C4) which then transfers it to the MN 26 (C5) which receives it. The MN 26 transmits a second QoS setup request (2) to the QoS setup server 50 by way of the HA 22 (C6 and C7) prior to sending a response to the first QoS setup request (1) (C11). The QoS setup server 50 transfers a response to the second QoS setup request (2) back to the MN 26 by way of the HA 22 so that the MN 26 receives it (C8 and C9) and first establishes a route with a QoS setup between the MN 26 and HA 22, that is, HoA and CoA (C10). Subsequently the MN 26 transfers a response to the first QoS setup request (1) (C11) to the QoS setup server 50 by way of the HA 22 (C12) so that the QoS setup server 50 transmits the response to the first QoS setup request (1) to the CN 32 (C13). As a result, the route with a QoS setup is established between the CN and HoA (C14), thereby enabling communication between the CN 32 and MN 26 based on a QoS assurance.

Figure 9:
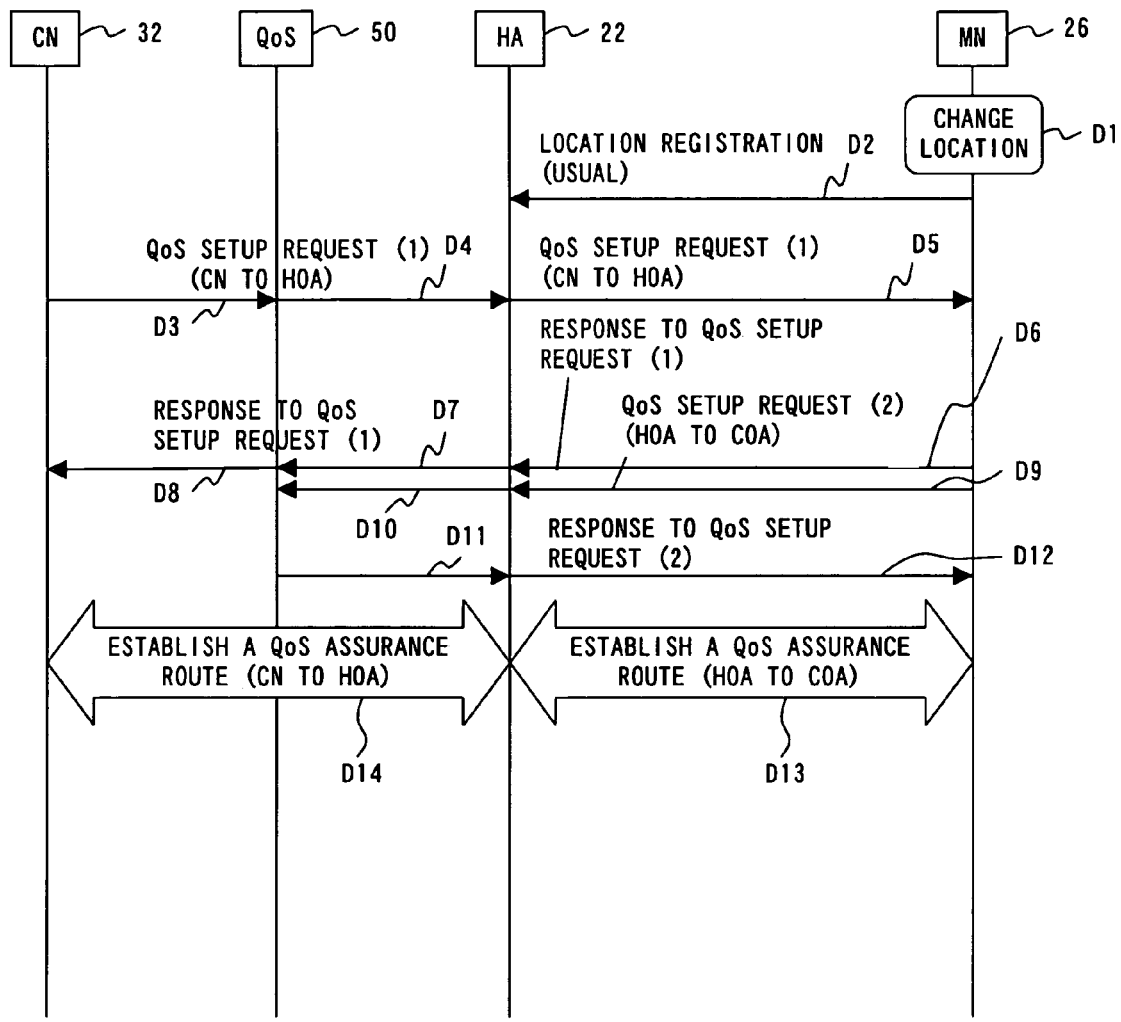
FIG. 9 describes a sequence for a fourth working example of QoS setup method according to the first embodiment of the present invention.

FIG. 9 describes a sequence for a fourth working example of a QoS setup method according to the first embodiment of the present invention. The difference from the third example shown by FIG. 8 is that the MN 26 returns a response to the first QoS setup request (1) (D6 and D7) and, at approximately the same time, sends a second QoS setup request (2) (D9 and D10) to establish a route with a QoS setup between the HoA and CoA (D13). This makes it possible to start the second QoS setup request (2) earlier than in the case of the third example shown by FIG. 8, thereby shortening the time required for completing the first QoS setup request (1) and the second QoS setup request (2).

Note that the above description has addressed the example of establishing a second QoS setup between the HA 22 and moved-to MN 26, but the second QoS setup may be established between the home network 20 and a visited network.

Figure 10:
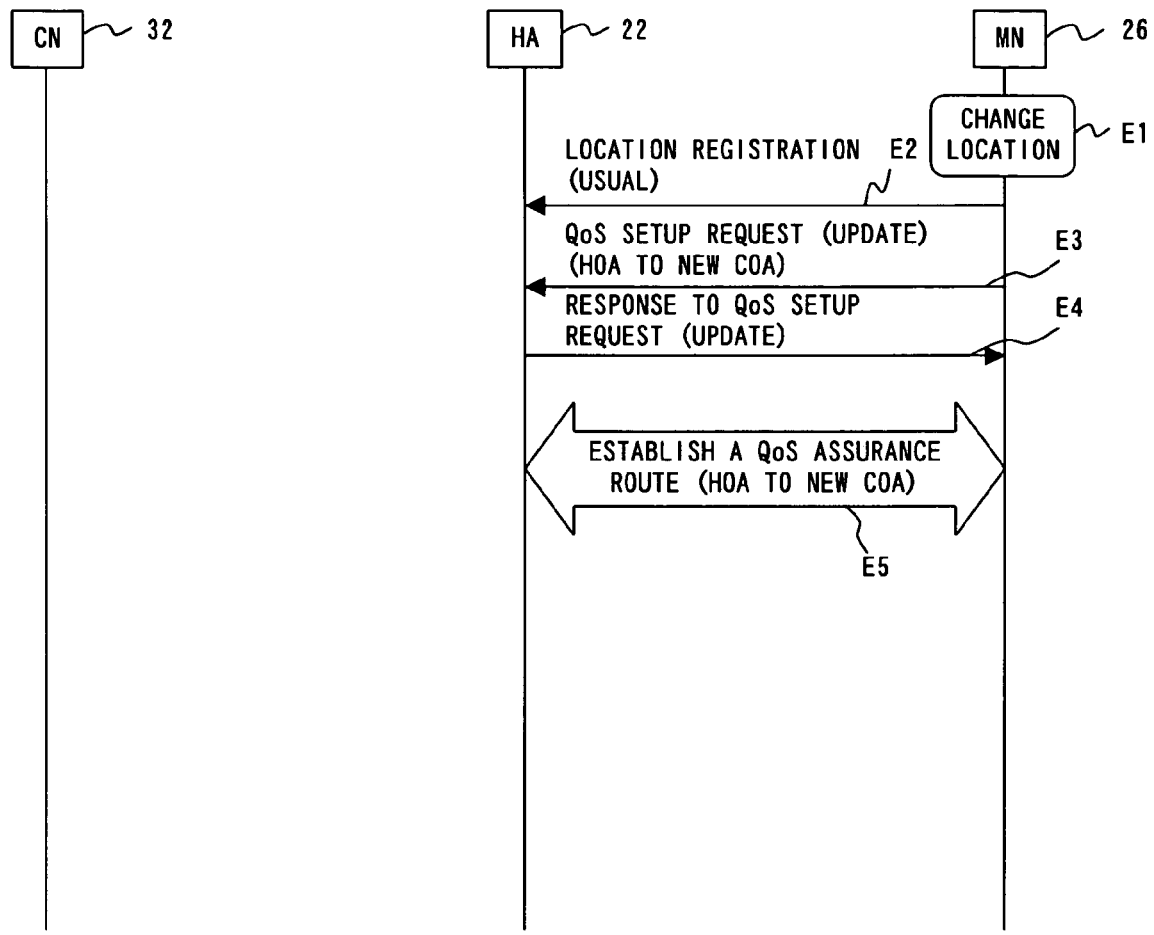
FIG. 10 describes a sequence at the time of handover according to the first and second working examples shown by FIGS. 6 and 7, respectively.

FIG. 10 describes a sequence at the time of handover according to the first and second working examples shown by FIGS. 6 and 7, respectively. At the time of handover, the MN 26 puts a position registration on record (i.e., update) at the HA 22 as usual (E2) and at the same time transmits a QoS setup request for updating the former QoS setup between the pre-moving CoA and the HoA to a new QoS setup between the moved-to CoA and the HoA by using on-path signaling (E3). And the MN 26 receives a response to the QoS setup request from the HA 22 (E4) to establish a route with a QoS setup between the HoA and the new CoA (E5).

Figure 11:
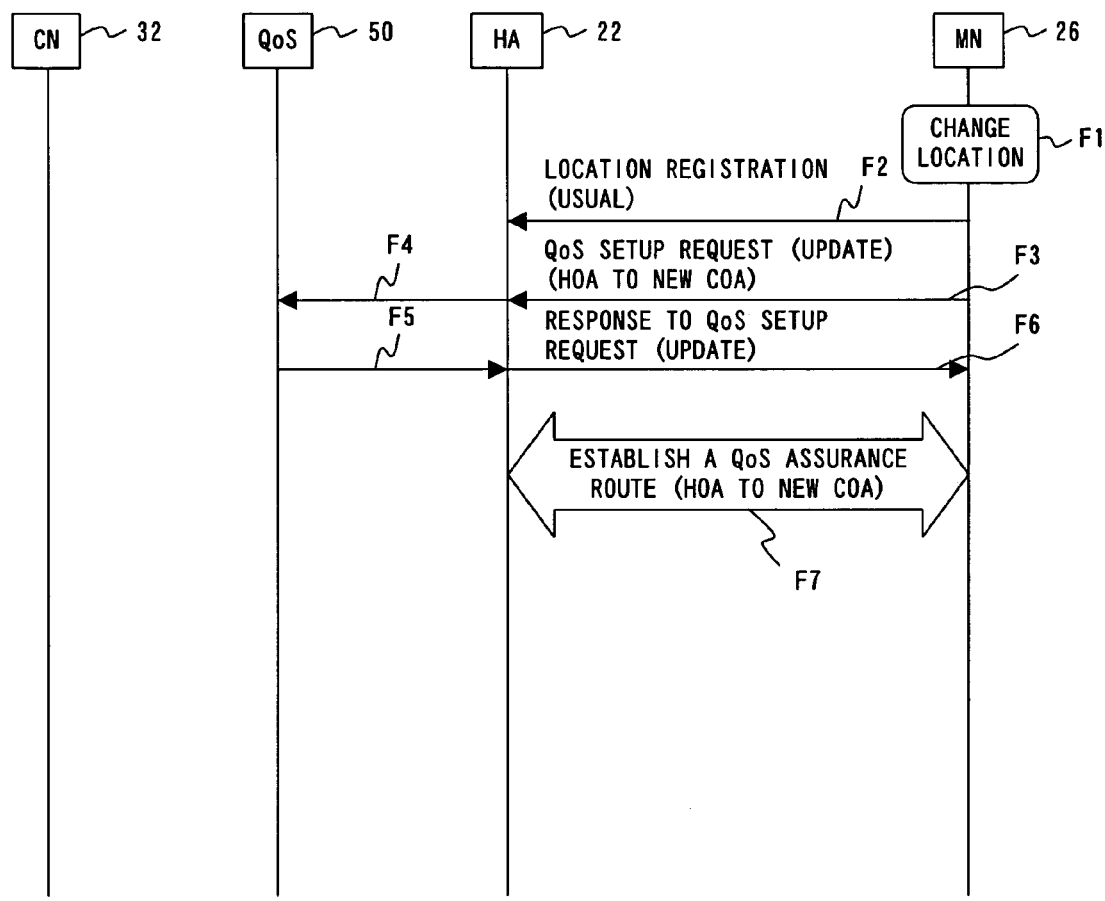
FIG. 11 describes a sequence at the time of handover according to the third and fourth working examples shown by FIGS. 8 and 9, respectively.

FIG. 11 describes a sequence at the time of handover according to the third and fourth working examples shown by FIGS. 8 and 9, respectively. At the time of handover, the MN 26 puts a position registration on record (i.e., update) at the HA 22 as usual (F2) and at the same time transmits a QoS setup request for updating the former QoS setup between the pre-moving CoA and the HoA to a new QoS setup between the moved-to CoA and the HoA by using off-path signaling (F3). And the MN 26 receives a response to the QoS setup request from the HA 22 (F6) to establish the route with a QoS setup between the HoA and the new CoA (F7).

Figure 1:
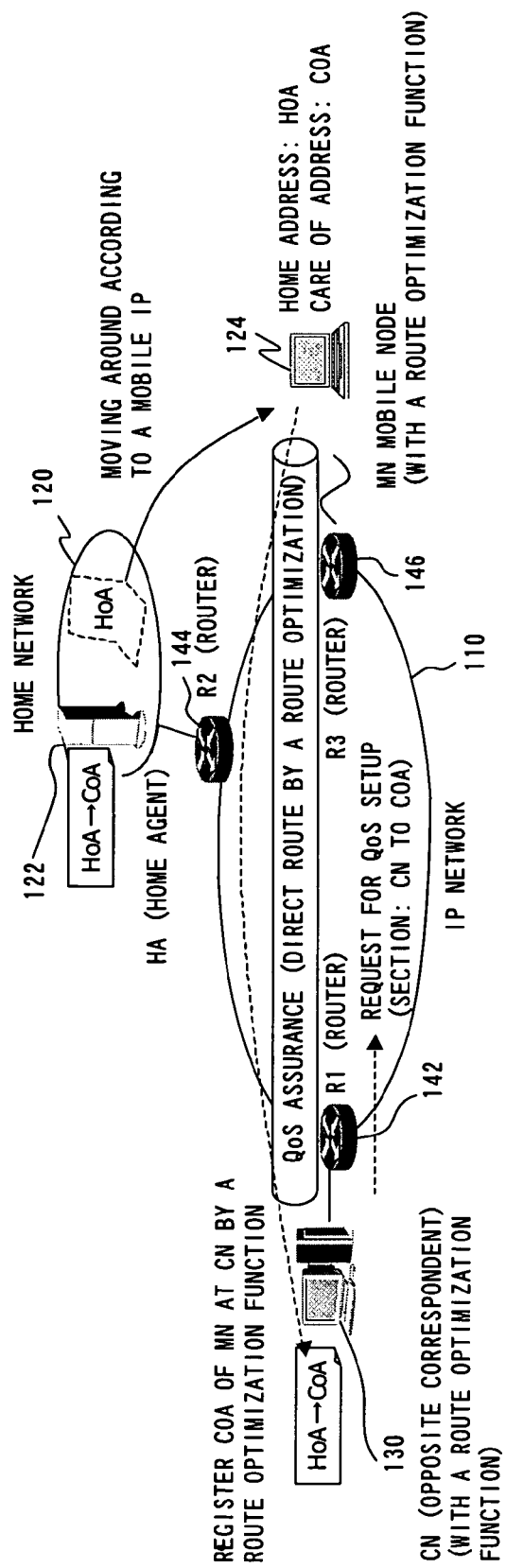
FIG. 1 describes a conventional QoS setup method premised on route optimization.

When a MN moves to switch the visited networks as described above, the conventional configuration shown by FIG. 1 requires the MN to register a switched-to new CoA at all the CNs which are then required to update QoS setups across all the direct routes to the new CoA, hence increasing the load and time consumed for QoS setup processing.

Whereas the QoS setup method used at the time of handover according to the present invention only requires the MN to update the QoS setup for the route between the HA and its own CoA regardless of the number of CNs and therefore does not require a update of QoS setup for the routes between all the CNs and HA. Because of this, the QoS setup method used at the time of handover according to the present invention brings about the benefits of reducing the load, shortening the switching time, et cetera, of the processing at the time of moving as well.

FIG. 12 shows a structure of a message relating to a second QoS setup request using a RSVP which is the representative protocol for on-path signaling. An RSVP message is made up of an IP header, transport header (i.e., User Datagram Protocol: UDP) (NB use of the UDP header is optional) and RSVP message. The RSVP message contains information such as session class and flow spec (i.e., band) which are required for QoS setup.

Figure 13:
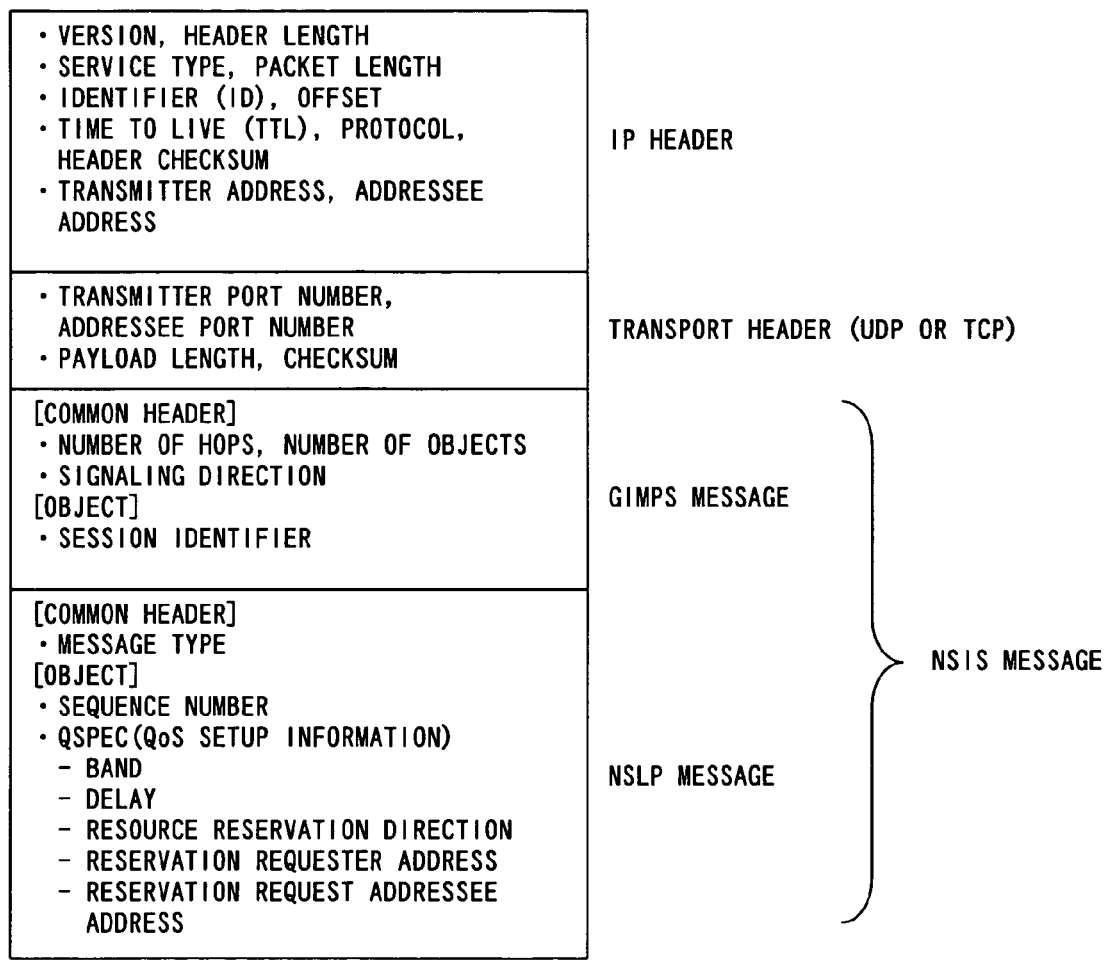
FIG. 13 shows the structure of a message relating to a second QoS setup request using NSIS.

FIG. 13 shows a structure of a message relating to a second QoS setup request using a NSIS which is the representative protocol for off-path signaling. A NSIS message is made up of an IP header, UDP header (NB TCP (transmission control protocol) header may be used instead) and NSIS message. A NSIS message is further made up of GIMPS (general Internet messaging protocol for signaling) and NSLP (NSIS signaling layer protocol) messages. The GIMPS and NSLP messages contain information such as a session identifier, QSPEC (band, delay, resource reservation direction, reservation requester address, reservation request addressee address), et cetera, which are necessary for QoS setup.

Figure 14:
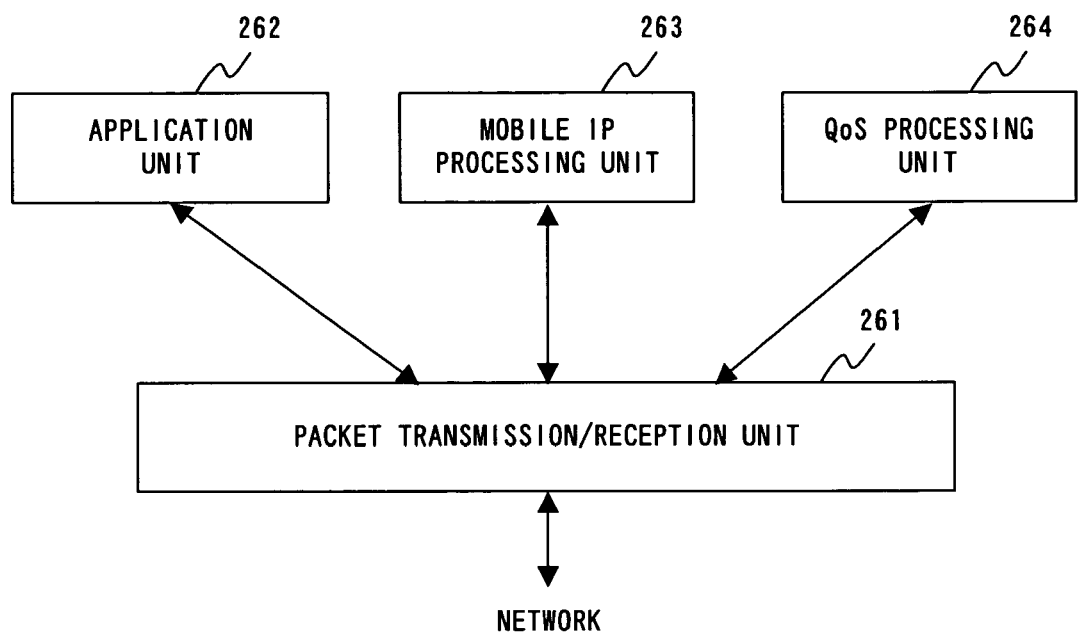
FIG. 14 is a functional block diagram showing a comprisal of a MN according to the first embodiment of the present invention.

FIG. 14 is a functional block diagram showing a comprisal of a mobile terminal MN according to the first embodiment of the present invention. The mobile terminal MN transmits and receives packets to and from a network by way of a packet transmission/reception unit 261. An application unit 262, accumulating various kinds of application software, executes the various applications imposed on the MN. A mobile IP processing unit 263 carries out usual mobile IP processing such as putting a position registration on record at the HA 22. Meanwhile, a QoS processing unit 264 transmits a second QoS setup request to the network by way of the packet processing unit 261 when a first QoS setup request is transmitted by way of the packet transmission/reception unit 261.

Figure 15:
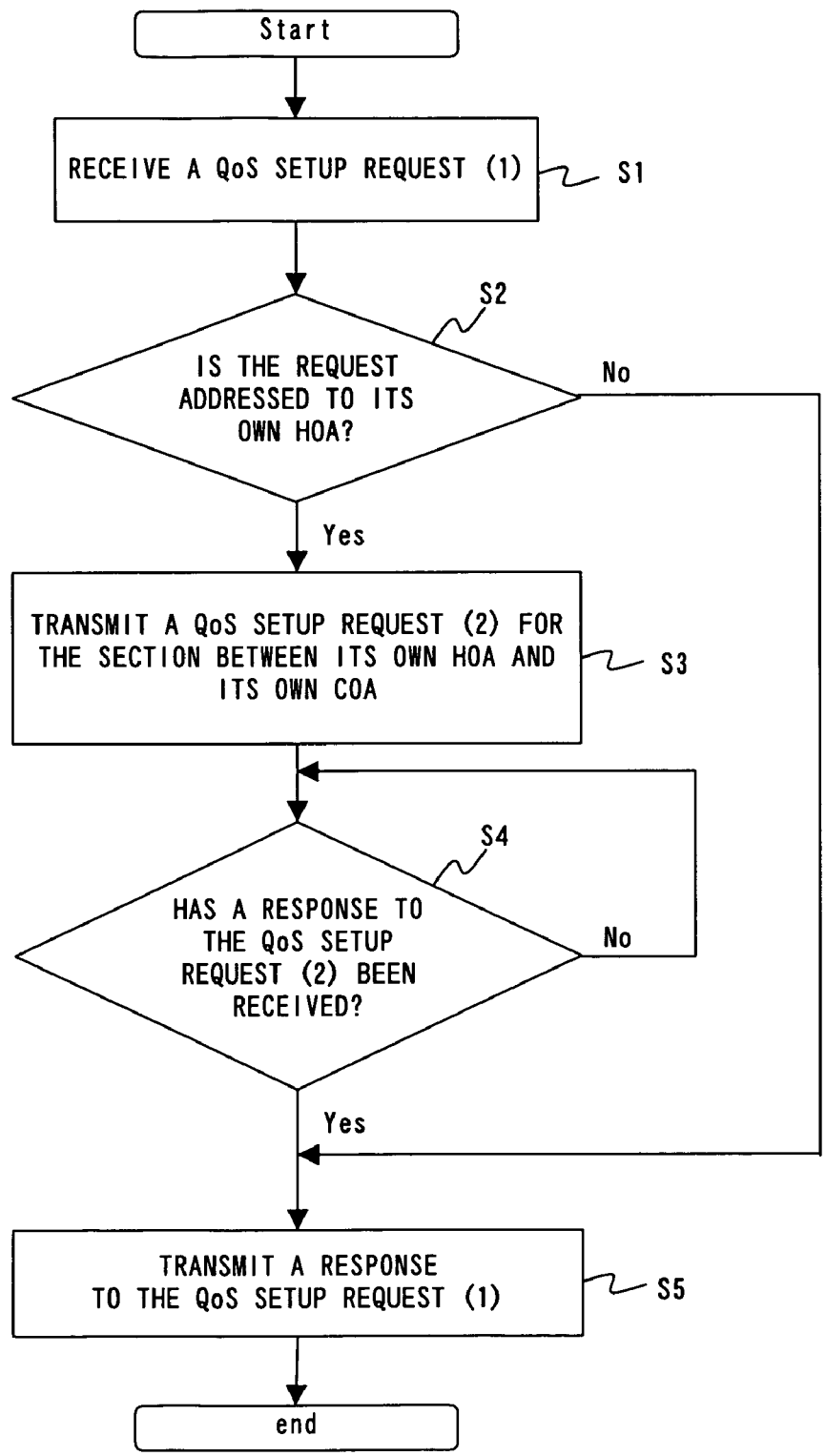
FIG. 15 is a flow chart for the MN shown by FIG. 14 carrying out the sequences shown by FIGS. 6 and 8.

FIG. 15 is a flow chart for the mobile terminal MN shown by FIG. 14 carrying out the sequences shown by FIGS. 6 and 8. Describing it while referring to FIG. 14, as the packet transmission/reception unit 261 receives a first QoS setup request (1) (S1) and the QoS processing unit 264 confirms that the addressee of the first QoS setup request (1) is the HoA of the mobile terminal MN (S2), the QoS processing unit 264 transmits a second QoS setup request (2) by way of the packet transmission/reception unit 261 (S3) and, when receiving a response to the second QoS setup request (2) (S4), then carries out a QoS setup between the HoA and CoA. Upon processing for the second QoS setup request (2) the QoS processing unit 264 transmits a response to the first QoS setup request (1) (S5).

FIG. 16 is a flow chart for the mobile terminal MN shown by FIG. 14 carrying out the sequences shown by FIGS. 7 and 9. Describing it while referring to FIG. 14, as the packet transmission/reception unit 261 receives a first QoS setup request (1) (S11), the QoS processing unit 264 transmits a response to the first QoS setup request (1) and at the same time transmits a second QoS setup request (2) for the section between its own HoA and its own CoA by way of the packet transmission/reception unit 261 (S12) and, when receiving a response to the second QoS setup request (2) (S13), then carries out a QoS setup between the HoA and CoA.

Making the MN applicable to the QoS setup method according to the present invention accomplishes a mobile communication with a QoS assurance between the CN and MN without adding a function of route optimization to a large number of the CNs existing in a network.

Figure 2:
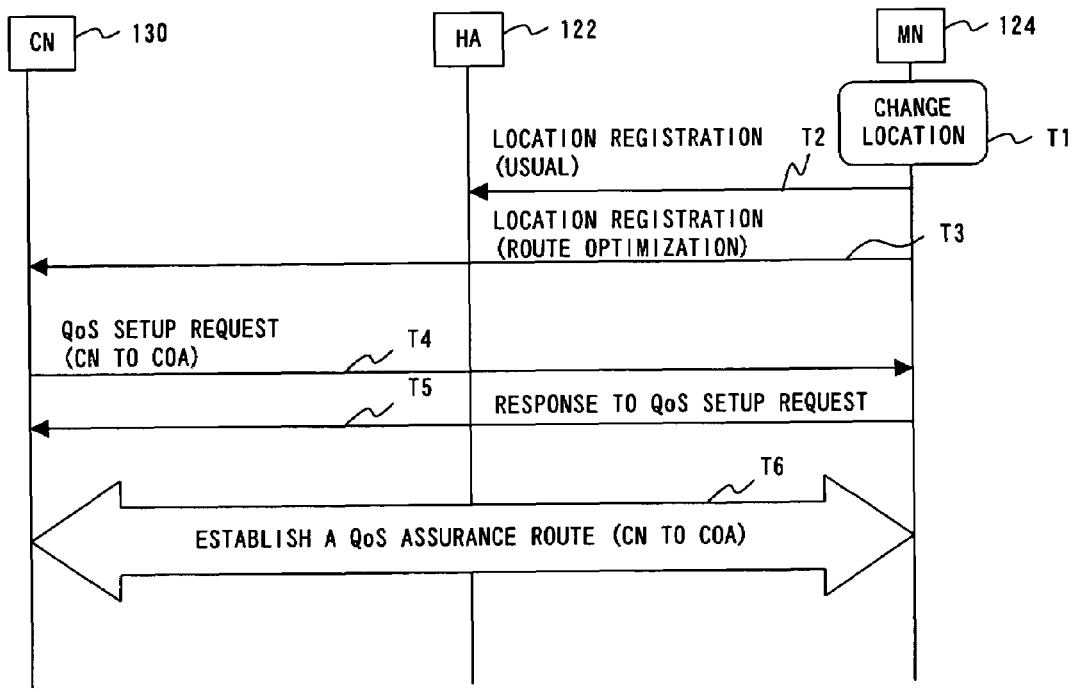
FIG. 2 describes a conventional QoS setup sequence for the configuration shown by FIG. 1.
Figure 3:
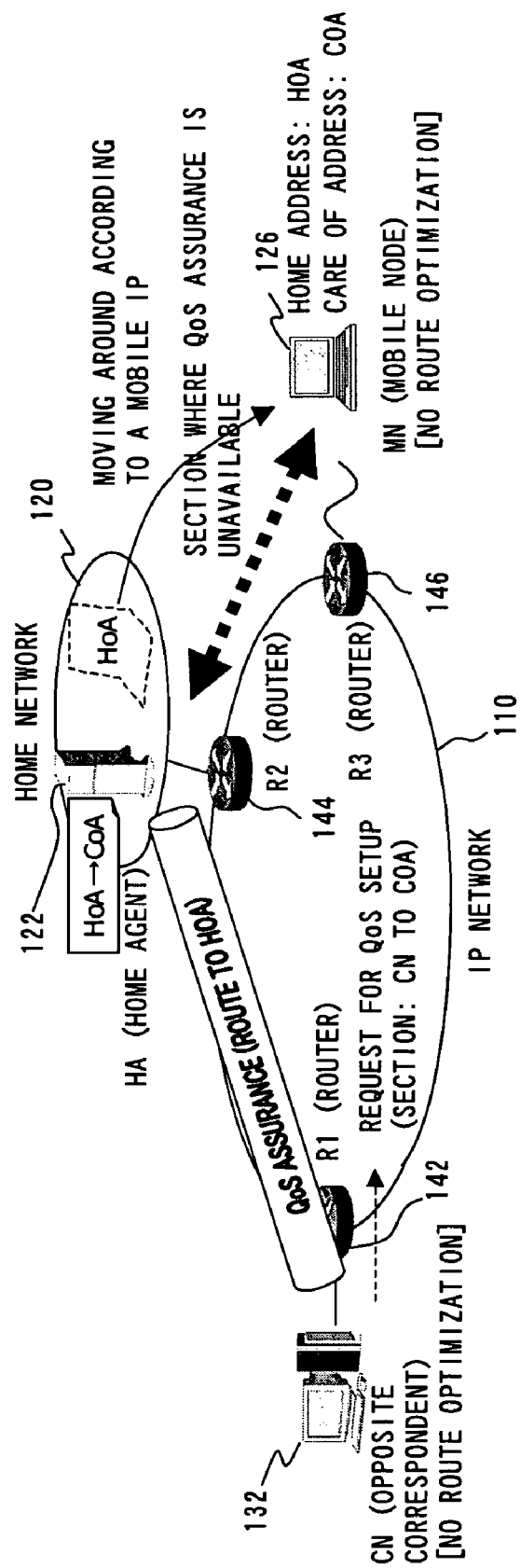
FIG. 3 describes issues in a QoS setup relating to conventional mobile communication in which route optimization is unavailable.
Figure 4:
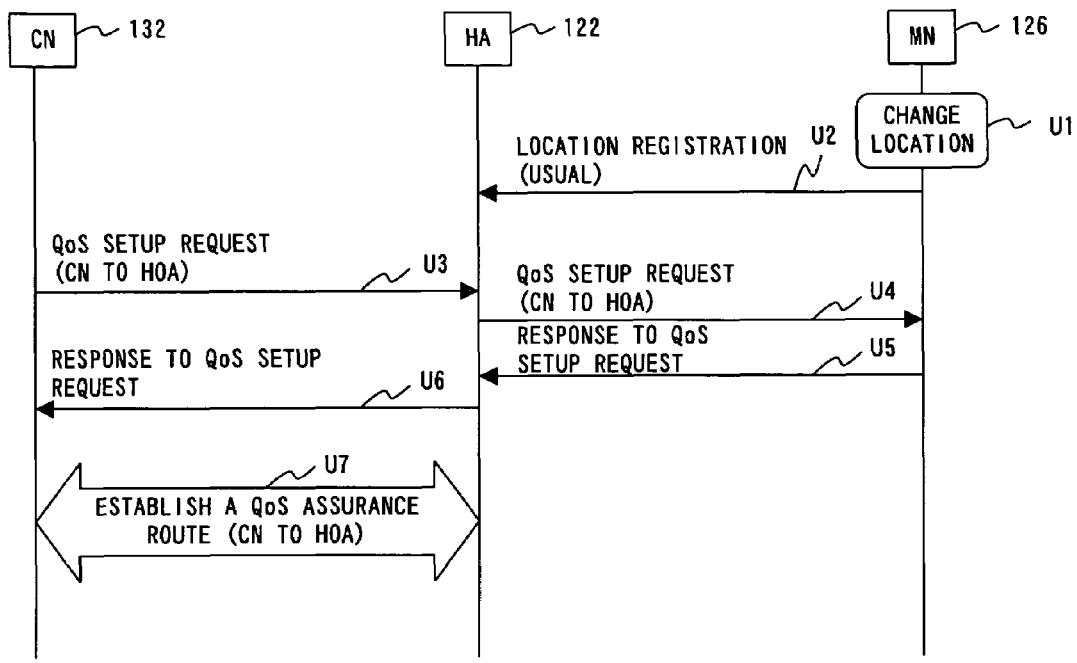
FIG. 4 describes a conventional QoS setup sequence for the system shown by FIG. 3.

In addition, the present invention, not premised on route optimization as in the case of the conventional example shown by FIG. 1, does not require the MN to put a position registration on record at the CN prior to engaging in a communication as shown by the sequence in FIG. 2, which eliminates a message for the position registration, making it possible to save the network resources and shorten the processing time. While the conventional example shown by FIGS. 1 and 2 has only one CN, the MN can conceivably communicate with a plurality thereof simultaneously. As the number of CNs with which the MN communicates increases, the position registration messages for route optimizations increase by the same amount, resulting in consuming network resources and increasing the processing time. Whereas the method according to the present invention requires only one position registration message to the HA regardless of the number of CNs to be communicated with, hence saving network resources and shortening the processing time greatly.

Second Embodiment

Figure 17:
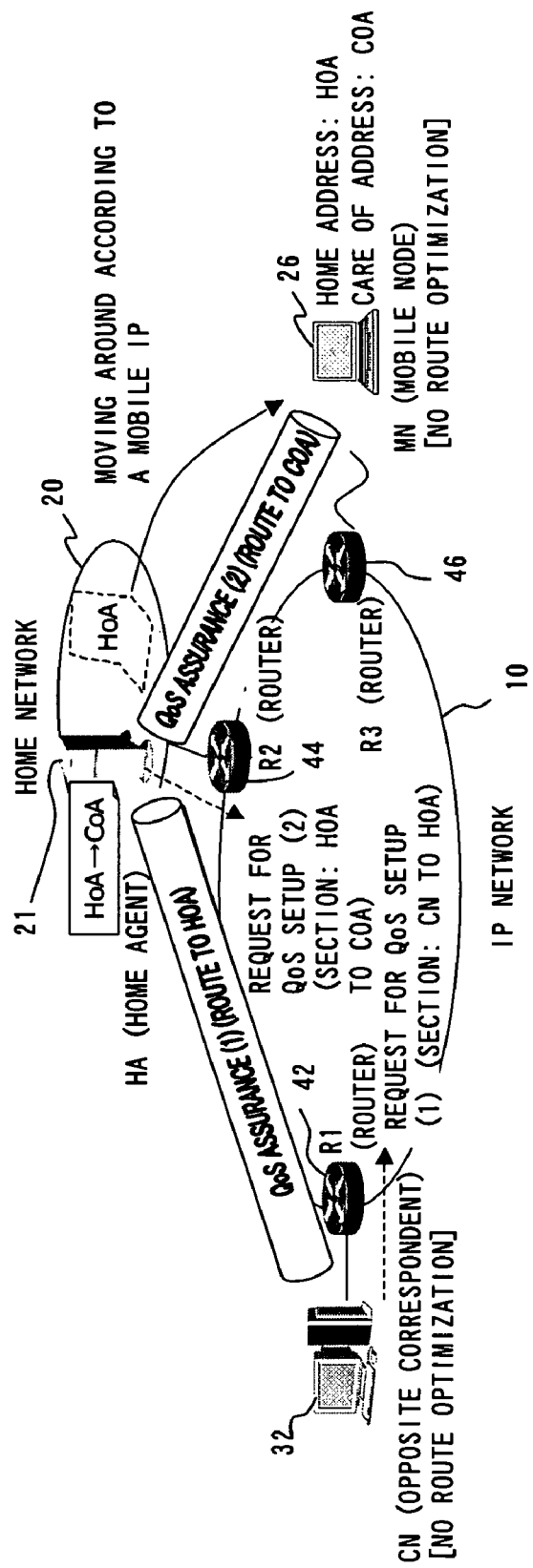
FIG. 17 describes a QoS setup method for a mobile communication system according to a second embodiment of the present invention.

FIG. 17 describes a QoS setup method for a mobile communication system according to a second embodiment of the present invention. The mobile communication system shown by FIG. 17 comprises a home network 20 including a mobile node MN 26 and home agent HA 21, and an IP network 10 including a plurality of routers 42 through 46. And mobile communication between the mobile node MN 26 and opposite correspondent terminal CN 32 is enabled by a first route connecting the CN 32 with a home agent HA 21 by the HoA (i.e., home address) of the MN 26, and second route connecting the HA 21 with the mobile node MN 26 by the CoA (i.e., care of address) thereof. Note that the description herein is based on the following assumption regarding connections, i.e., the CN 32 to a first router 42, the home agent HA 21 to a second router 44, and the MN 26 to a third router 46, respectively.

And a QoS setup method according to the second embodiment of the present invention comprises the steps of the HA 21 recognizing a first QoS setup request when an opposite correspondent CN 32 makes the first QoS setup request for the route to the HoA of mobile node MN 26, and making a second QoS setup request for a route between the HoA and CoA of the MN 26.

Note that the first and second QoS setups may be through on-path signaling, off-path signaling (NB QoS setup node is not shown in drawings herein), or any other signaling method.

Figure 18:
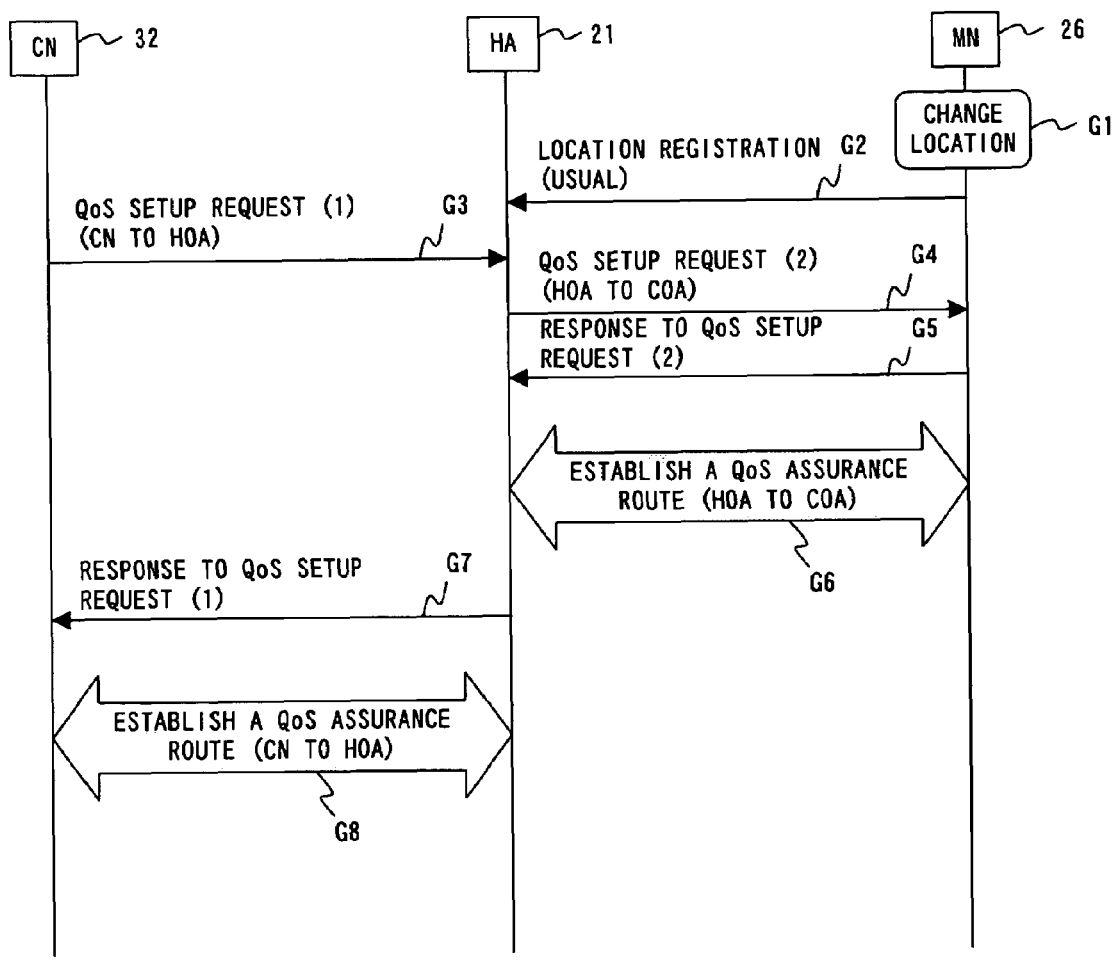
FIG. 18 describes a sequence for a first working example of a QoS setup method according to the second embodiment of the present invention.

FIG. 18 describes a sequence for a first working example of QoS setup method according to the second embodiment of the present invention. This example is the case of using on-path signaling, in which the MN 26, as it moves away from the home network (G1), puts a position registration on record at the HA 21 as usual (G2). A first QoS setup request (1) from the CN 32 (G3) is received by the HA 21 which then sends a second QoS setup request (2) to the MN 26 (G4) to first establish a route with a QoS setup between the HoA and CoA (G6), prior to returning a response to the first QoS setup request (1) back to the CN 32 (G7). Subsequently, the HA 21 returns a response to the first QoS setup request (1) back to the CN 32 (G7). This establishes the route with a QoS setup between the CN and HoA (G8), thereby enabling communication based on a QoS assurance between the CN 32 and MN 26.

FIG. 19 describes a sequence for a second working example of a QoS setup method according to the second embodiment of the present invention. The difference from FIG. 18 is that the HA 21 returns a response to a first QoS setup request (1) (H4) and at the same time sends a second QoS setup request (2) to the MN 26 (H5) to establish a route with a QoS setup between the HoA and CoA (H7). This makes it possible to complete the response to the first QoS setup request (1) earlier than in the case of FIG. 18, thereby shortening the required time for completing the first QoS setup request (1) (H3) and second QoS setup request (2) (H5).

Incidentally, for FIGS. 18 and 19, in the case of using RSVP as a protocol for a QoS setup by using on-path signaling, a QoS setup request (1) and QoS setup request (2) become Resv messages according to the RSVP in which a response to the QoS setup request (1) or to the one about the QoS setup request (2) is not required since no response message is returned vis-à-vis a Resv message. Meanwhile, a path message will be transmitted prior to a Resv message although it is not shown in the drawings.

FIG. 20 describes a sequence for a third working example of a QoS setup method according to the second embodiment of the present invention. This example is the case of using off-path signaling for a QoS setup, in which the MN 26, as it moves away from the home network (J1), puts a position registration on record at the HA 21 as usual (J2). A first QoS setup request (1) from the CN 32 (J3) is received by the HA 21 after going through a QoS setup server 50 (NB while FIG. 20 only shows one, an actual setup request may go through a plurality thereof) installed in a management unit of the network (NW) (J4). The HA 21 transmits a second QoS setup request (2) to the QoS setup server 50 (J5) prior to responding (J13) to the first QoS setup request (1) (J3). The QoS setup server 50 transfers the second QoS setup request (2) to the MN 26 by way of the HA 21 (J6 and J7). The MN 26 transfers a response to the second QoS setup request (2) (J8) to the QoS setup server 50 by way of the HA 21 so that the QoS setup server 50 receives it (J8 and J9) and responds to the HA 21 with the fact of receiving it (J10). As a result, a route with a QoS setup is established between the HoA and CoA (J11). Subsequently, the HA 21 transmits a response to the first QoS setup request (1) (J12) to the CN 32 by way of the QoS setup server 50 (J13), resulting in establishing a route with a QoS setup between the CN and HoA (J14), thereby enabling communication between the CN 32 and MN 26 based on a QoS assurance.

Figure 21:
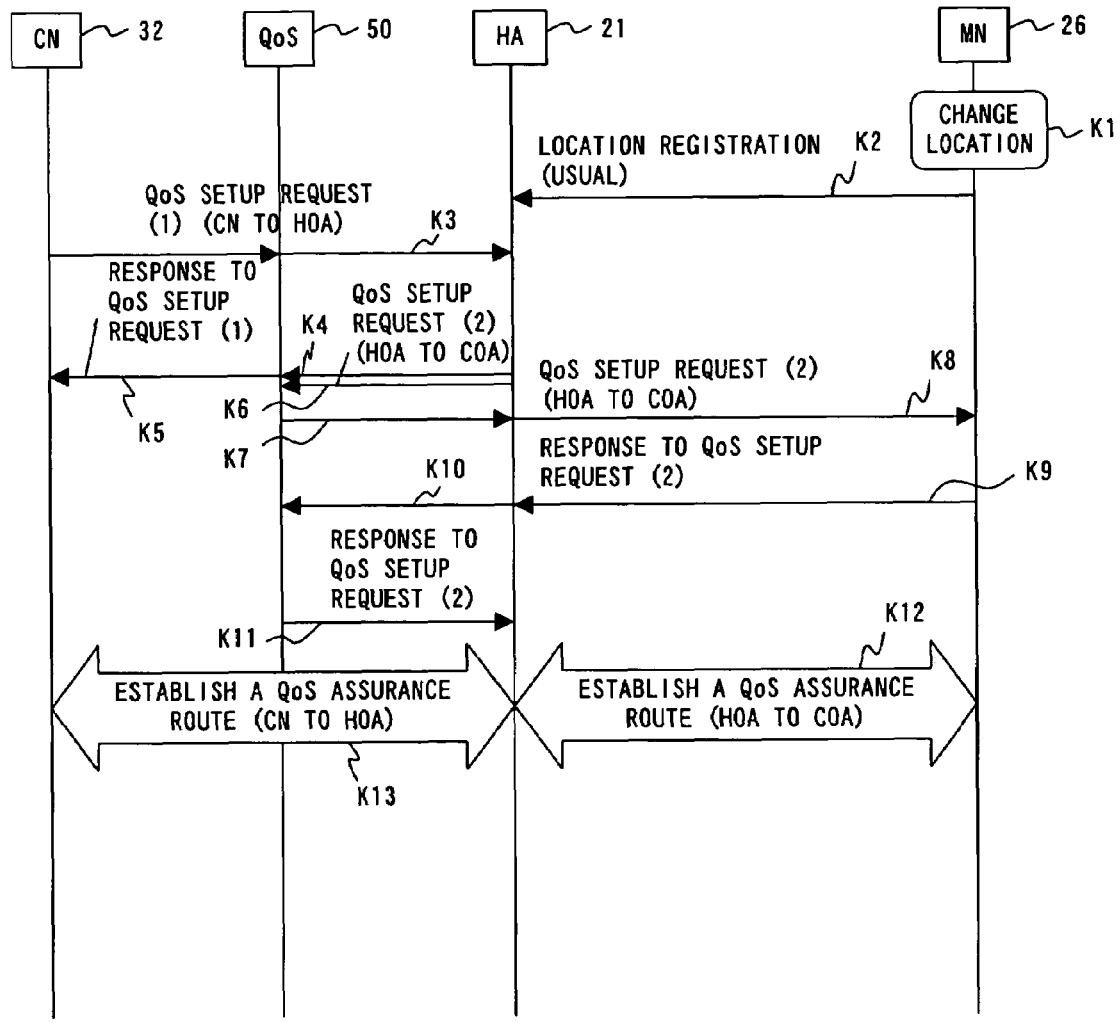
FIG. 21 describes a sequence for a fourth working example of a QoS setup method according to the second embodiment of the present invention.

FIG. 21 describes a sequence for a fourth working example of a QoS setup method according to the second embodiment of the present invention. The difference from FIG. 20 is that the HA 21 returns a response to a first QoS setup request (1) (K4 and K5), followed by sending a second QoS setup request (2) (K6) and establishing the route with a QoS setup between the CN and HoA as well as the HoA and CoA approximately at the same time (K12 and K13).

Meanwhile, the above descriptions have described examples of establishing the second QoS setup between the HA 21 and MN 26, but the second QoS setup may be established between the home network 20 and a visited network.

Figure 22:
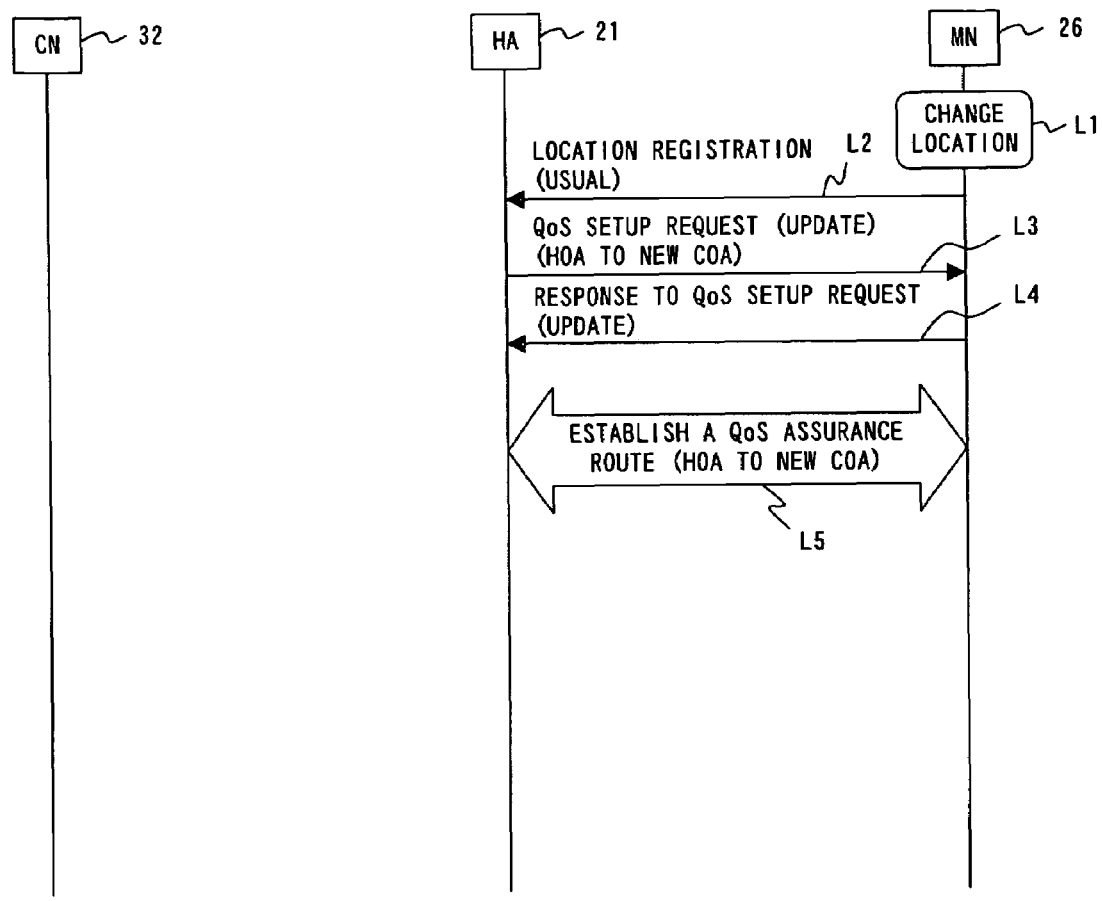
FIG. 22 describes a sequence at the time of handover according to the first and second working examples shown by FIGS. 18 and 19, respectively.

FIG. 22 describes a sequence at the time of handover according to the first and second working examples shown by FIGS. 18 and 19, respectively. At the time of handover, the MN 26 puts a position registration on record (i.e., update) at the HA 21 as usual (L2) and at the same time transmits a QoS setup request for updating the former QoS setup between the pre-moving CoA and the HoA to a new QoS setup between the moved-to CoA and the HoA by using on-path signaling (L3). And the HA 21 receives a response to the QoS setup request from the MN 26 (L4) to establish a route with a QoS setup between the HoA and the new CoA (L5).

FIG. 23 describes a sequence at the time of handover according to the third and fourth working examples shown by FIGS. 20 and 21, respectively. At the time of handover, the MN 26 puts a position registration on record (i.e., update) at the HA 21 as usual (M2). Having received it, the HA 21 transmits a QoS setup request to the QoS setup server 50 for updating the former QoS setup between the pre-moving CoA and the HoA to a new QoS setup between the moved-to CoA and the HoA by using off-path signaling (M3). The QoS setup server 50 transfers the QoS setup request for updating to the moved-to CoA and the HoA to the MN 26 by way of the HA 21 (M4 and M5). The MN 26 transmits a response to the QoS setup request (i.e., update) to the QoS setup server 50 by way of the HA 21 (M7). The QoS setup server 50 receives it and transmits a response to the QoS setup request to the HA 21 by using off-path signaling (M8), resulting in establishing the route with a QoS setup between the HoA and new moved-to CoA.

Figure 24:
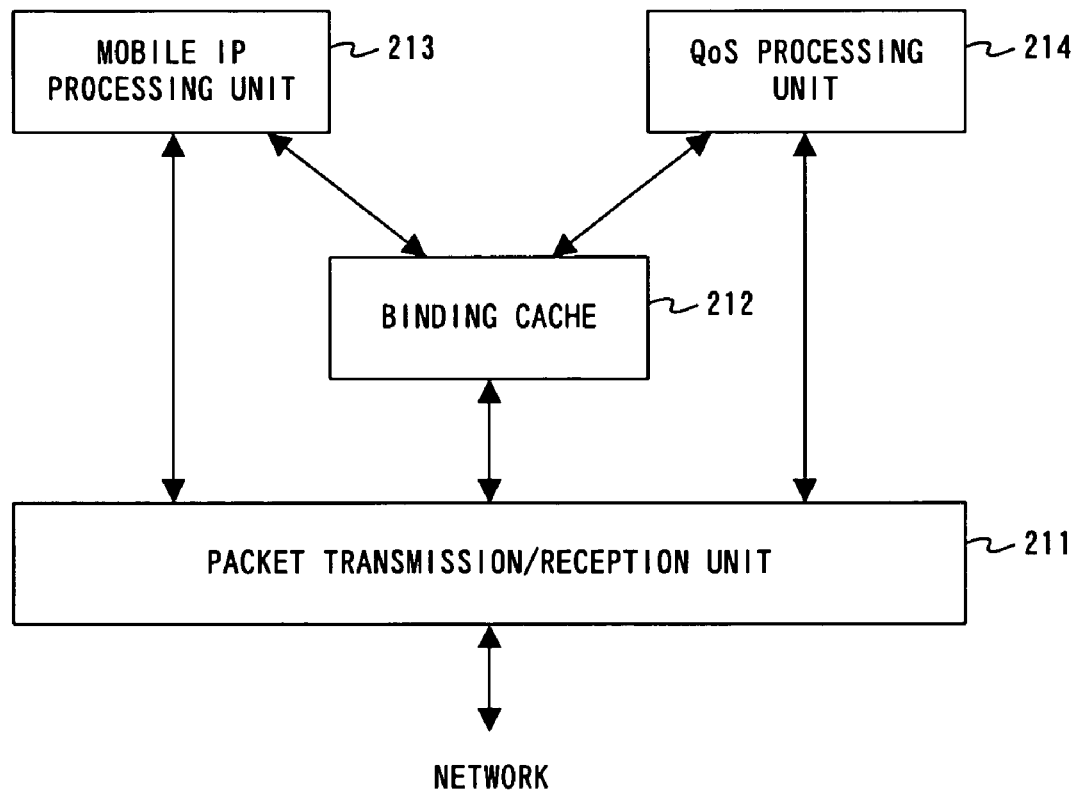
FIG. 24 is a functional block diagram showing a comprisal of a HA according to the second embodiment of the present invention.

FIG. 24 is a functional block diagram showing a comprisal of a home agent HA according to the second embodiment of the present invention. The home agent HA transmits and receives packets with a network by way of a packet transmission/reception unit 211. A mobile IP processing unit 213 carries out usual mobile IP processing such as location registration in accordance with packet message content received by way of the packet transmission/reception unit 211. And a binding cache 212 retains a correspondence relationship between the home address HoA and care of address CoA of a mobile terminal MN 26 which has put a position registration on record. A QoS processing unit 214 sends a second QoS setup request out to the network by way of the packet transmission/reception unit 211 when receiving a first QoS setup request by way thereof.

Figure 25:
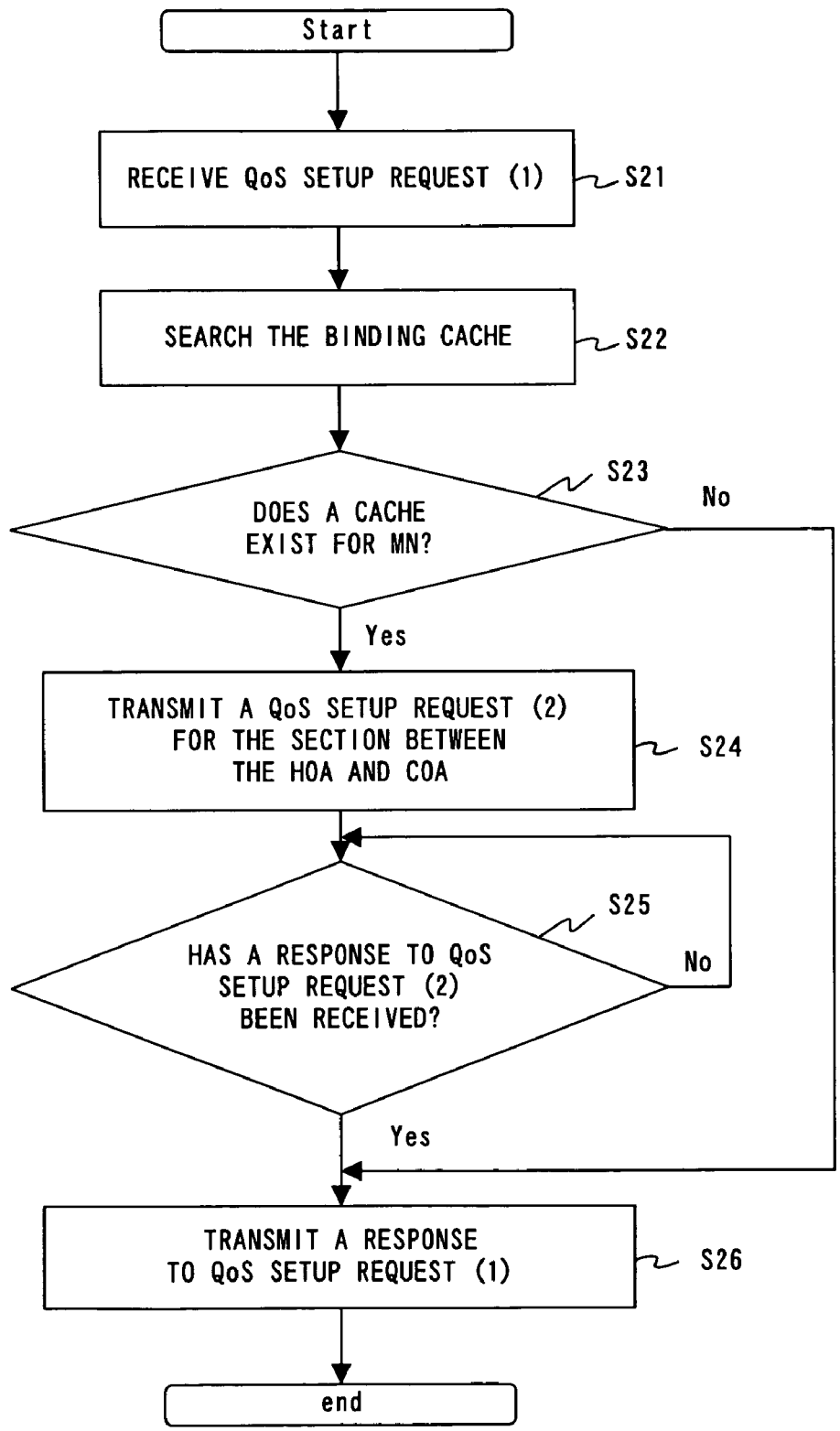
FIG. 25 is a flow chart for the HA shown by FIG. 24 carrying out the sequences shown by FIGS. 18 and 20.

FIG. 25 is a flow chart for the home agent HA according to the second embodiment of the present invention carrying out the sequences shown by FIGS. 18 and 20. Describing it while referring to FIG. 24, as the packet transmission/reception unit 211 receives a first QoS setup request (1) (S21), the QoS processing unit 214 searches the binding cache 212 for a HoA of the MN which is the addressee of the first QoS setup request (1) (S22). If a cache is found in the binding cache 212 (S23), the QoS processing unit 214 transmits a second QoS setup request (2) by way of the packet transmission/reception unit 211 (S24), and carries out QoS setup between the HoA and CoA. When completing the second QoS setup request (2) (S25), the QoS processing unit 214 transmits a response to the first QoS setup request (1) (S26).

Figure 26:
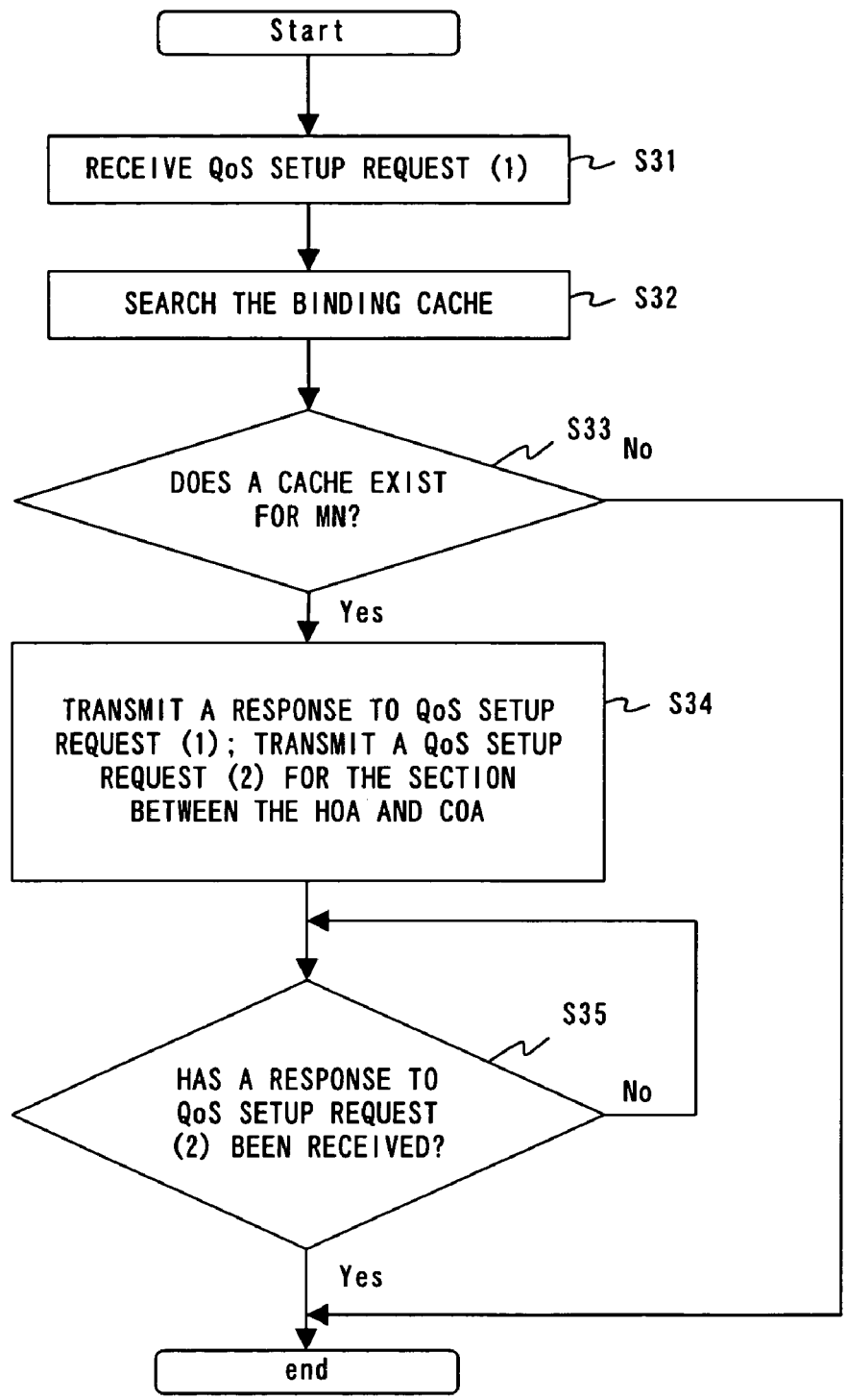
FIG. 26 is a flow chart for the HA shown by FIG. 24 carrying out the sequences shown by FIGS. 19 and 21.

FIG. 26 is a flow chart for the home agent HA according to the second embodiment of the present invention carrying out the sequences shown by FIGS. 19 and 21. Describing it while referring to FIG. 24, as the packet transmission/reception unit 211 receives a first QoS setup request (1) (S31), the QoS processing unit 214 searches the binding cache 212 for a HoA of the MN which is the addressee of the first QoS setup request (1) (S32). If a cache is found in the binding cache 212 (S33), the QoS processing unit 214 transmits a response to the first QoS setup request (1) and at the same time transmits a second QoS setup request (2) by way of the packet transmission/reception unit 211 (S34), and carries out QoS setup between the HoA and CoA if it receives a response to the second QoS setup request (2) (S35).

Making the HA applicable to the QoS setup method according to the present invention accomplishes mobile communication with QoS assurance between the CN and MN without adding a function of route optimization to a large number of CNs existing in a network.

In addition, the present invention, not premised on route optimization as in the case of the conventional example shown by FIG. 1, does not require the MN to put a position registration on record at the CN prior to engaging in communication as shown by the sequence in FIG. 2, which eliminates a message for the position registration, making it possible to save network resources and shorten processing time. While the conventional example shown by FIGS. 1 and 2 has only one CN, the MN can conceivably communicate with a plurality thereof simultaneously. As the number of CNs with which the MN communicates increases, the position registration messages for route optimization increase by the same amount, resulting in consuming network resources and increasing processing time. Whereas the method according to the present invention requires only one position registration message to the HA regardless of the number of CNs to be communicated with, hence saving network resources and shortening processing time greatly.

Third Embodiment

Figure 27:
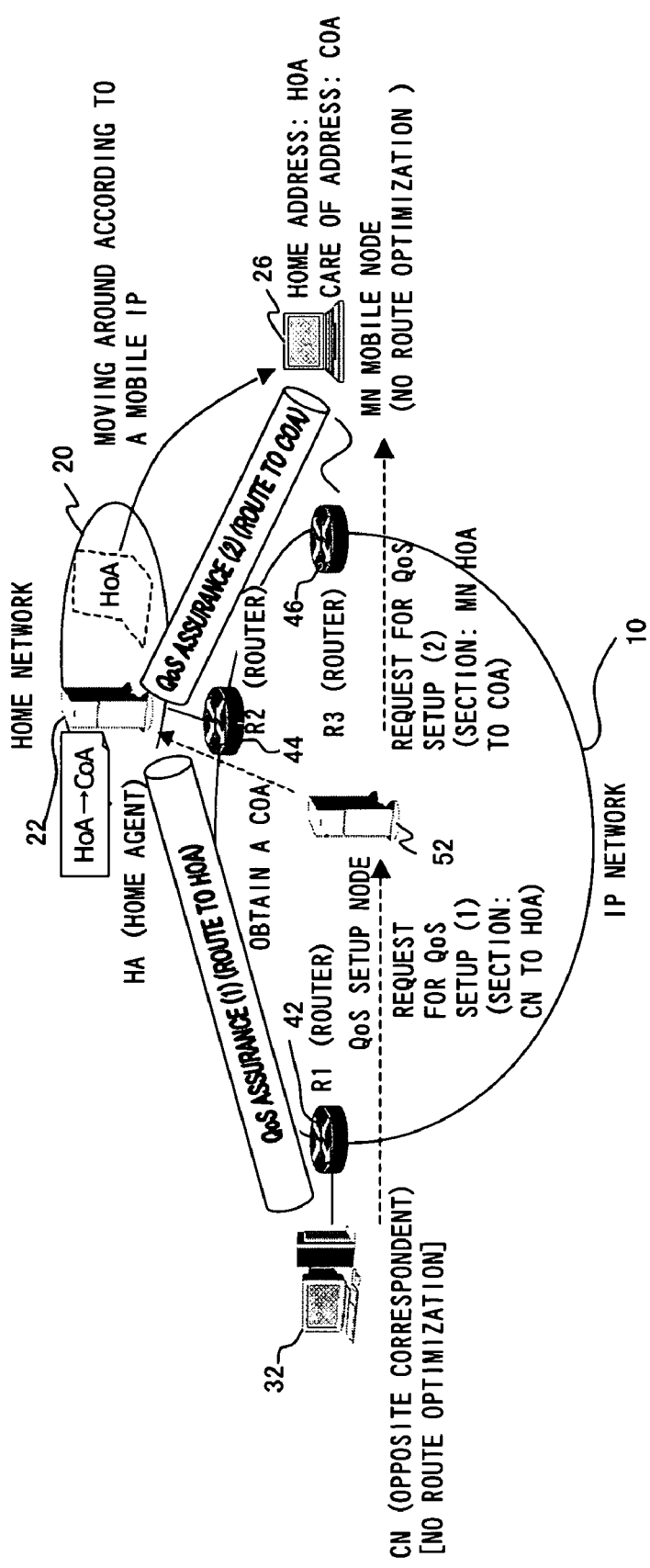
FIG. 27 describes a QoS setup method for a mobile communication system according to a third embodiment of the present invention.

FIG. 27 describes a QoS setup method for a mobile communication system according to a third embodiment of the present invention. The mobile communication system shown by FIG. 27 comprises a home network 20 including a mobile node MN 26 and home agent HA 22, a QoS setup node 52 for processing a QoS setup request and an IP network 10 including a plurality of routers 42 through 46. And mobile communication between the mobile node MN 26 and opposite correspondent terminal CN 32 is enabled by a first route connecting the CN 32 with a home agent HA 22 by the HoA (i.e., home address) of the MN 26, and second route connecting the HA 22 with the mobile node MN 26 by the CoA (i.e., care of address) thereof. Note that the description herein is based on the following assumption regarding the QoS setup node 52 accessible to a node within the network 10 and regarding connections, i.e., the CN 32 to a first router 42, the home agent HA 22 to a second router 44, and the MN 26 to a third router 46, respectively.

And a QoS setup method according to the third embodiment of the present invention comprises the steps of the QoS setup node recognizing a first QoS setup request when an opposite correspondent CN 32 makes the first QoS setup request for the route to the home address HoA of a mobile node MN 26, obtaining a care of address for the MN 26 from the HA 22, and making a second QoS setup request for the route from the HoA to CoA of the MN 26. Incidentally the first and second QoS setups use off-path signaling.

Figure 28:
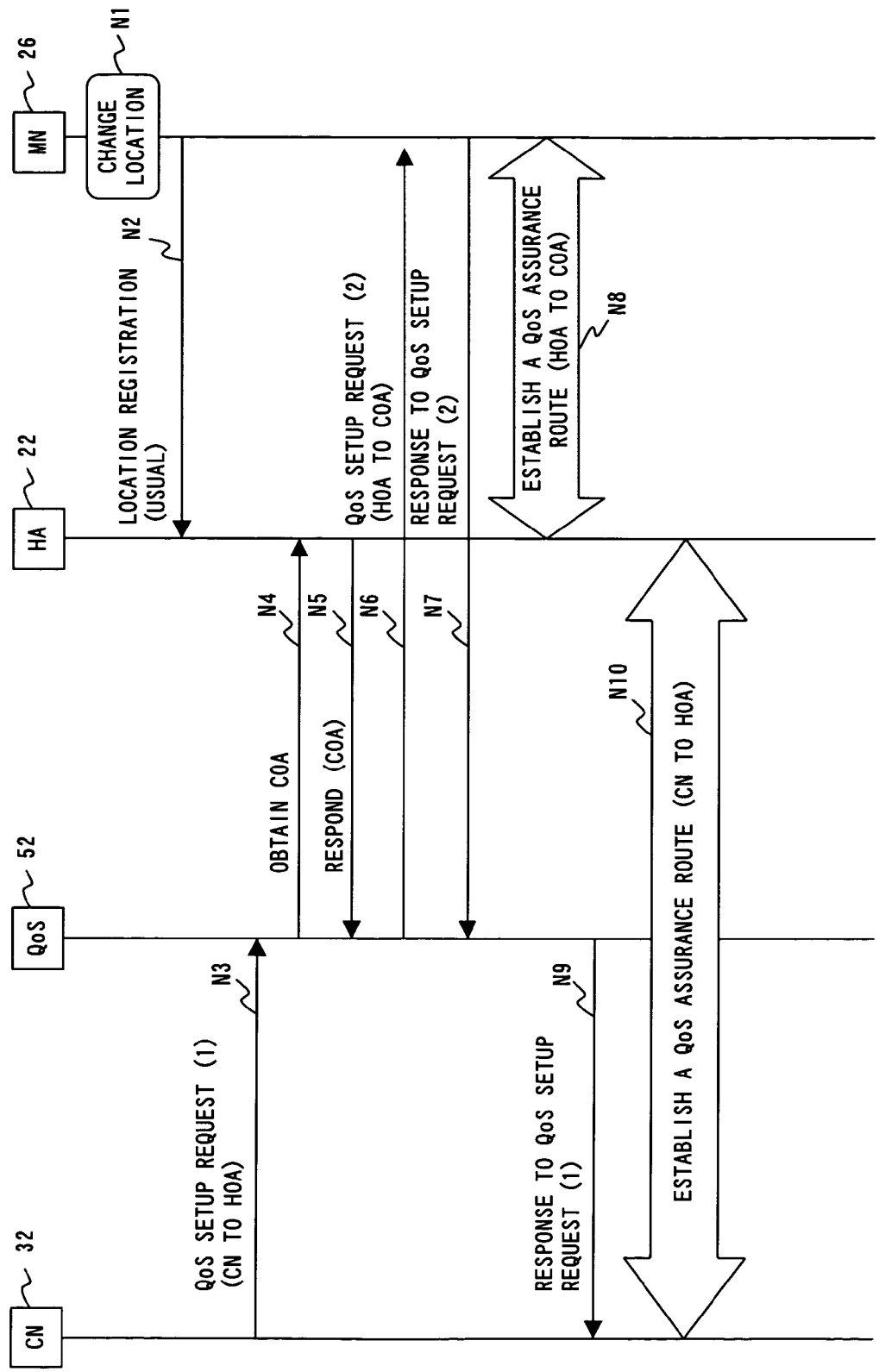
FIG. 28 describes a sequence for a first working example of a QoS setup method according to the third embodiment of the present invention.

FIG. 28 describes a sequence for a first working example of a QoS setup method according to the third embodiment of the present invention. This example is the case of using off-path signaling, in which the MN 26, as it moves away from the home network (N1), puts a position registration on record at the HA 22 as usual (N2). A first QoS setup request (1) from the CN 32 is received by a QoS setup server 52 (N3 while FIG. 28 only shows one, an actual setup request may go through a plurality thereof) (N3). The QoS setup node 52 queries the HA 22 (N4) to obtain the CoA of the MN 26 (N5), sends a second QoS setup request (2) to the MN 26 (N6) and, if a response thereto is received, first establishes the route with a QoS setup between the HoA and CoA, before sending a response to the first QoS setup request (1) back to the CN 32 (N9). Subsequently, the QoS setup server 52 returns a response to the first QoS setup request (1) back to the CN 32 (N9), resulting in establishing a route with a QoS setup between the CN and HoA (N10), thereby enabling communication based on a QoS assurance between the CN 32 and MN 26.

FIG. 29 describes a sequence for a second working example of a QoS setup method according to the third embodiment of the present invention. The difference from FIG. 28 is that the QoS setup node 52 returns a response to the first QoS setup request (1) (P4) and at approximately the same time queries the HA 22 (P5) to obtain the CoA of the MN 26, sends a second QoS setup request (2) to the MN 26 (P7) and, if a response to the second QoS setup request (2) is received (P8), establishes the route with a QoS setup between the HoA and CoA (P9). This makes it possible to finish the responses to the first and second QoS setup requests more quickly than in the case of FIG. 28, hence shortening the required time for completing the first and second QoS setup requests.

Meanwhile, the above descriptions have described examples of establishing the second QoS setup between the HA 22 and MN 26, but the second QoS setup may be established between the home network 20 and a visited network.

Figure 30:
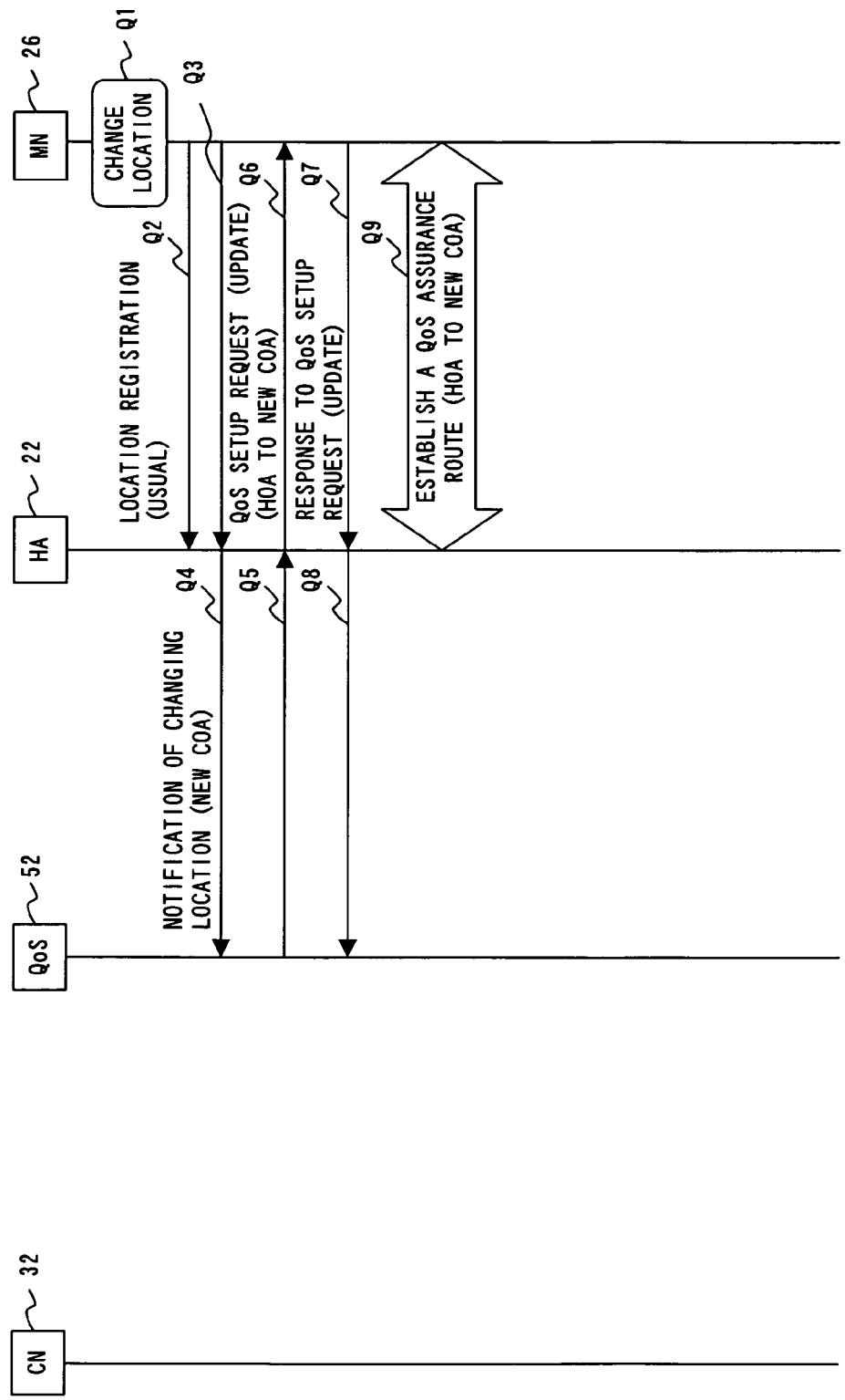
FIG. 30 describes a first sequence at the time of handover according to the first and second working examples shown by FIGS. 28 and 29, respectively.

FIG. 30 describes a first sequence at the time of handover according to the first and second working examples shown by FIGS. 28 and 29, respectively. At the time of handover, the MN 26 puts a position registration on record (i.e., update) at the HA 22 as usual (Q2), and notifies the QoS setup node 52, by way of the HA 22, of the CoA being changed due to change of location (Q3 and Q4). The QoS setup node 52 transmits by using off-path signaling a QoS setup request for updating the pre-moving QoS setup between the old CoA and HoA to a new one between the moved-to CoA and HoA (Q5 and Q6). The MN 26 transmits, by way of the HA 22, a response to the QoS setup request (i.e., update) to the QoS setup node 52 (Q7) which receives it (Q8), resulting in establishing a route with a QoS setup between the HoA and new CoA (Q9).

Figure 31:
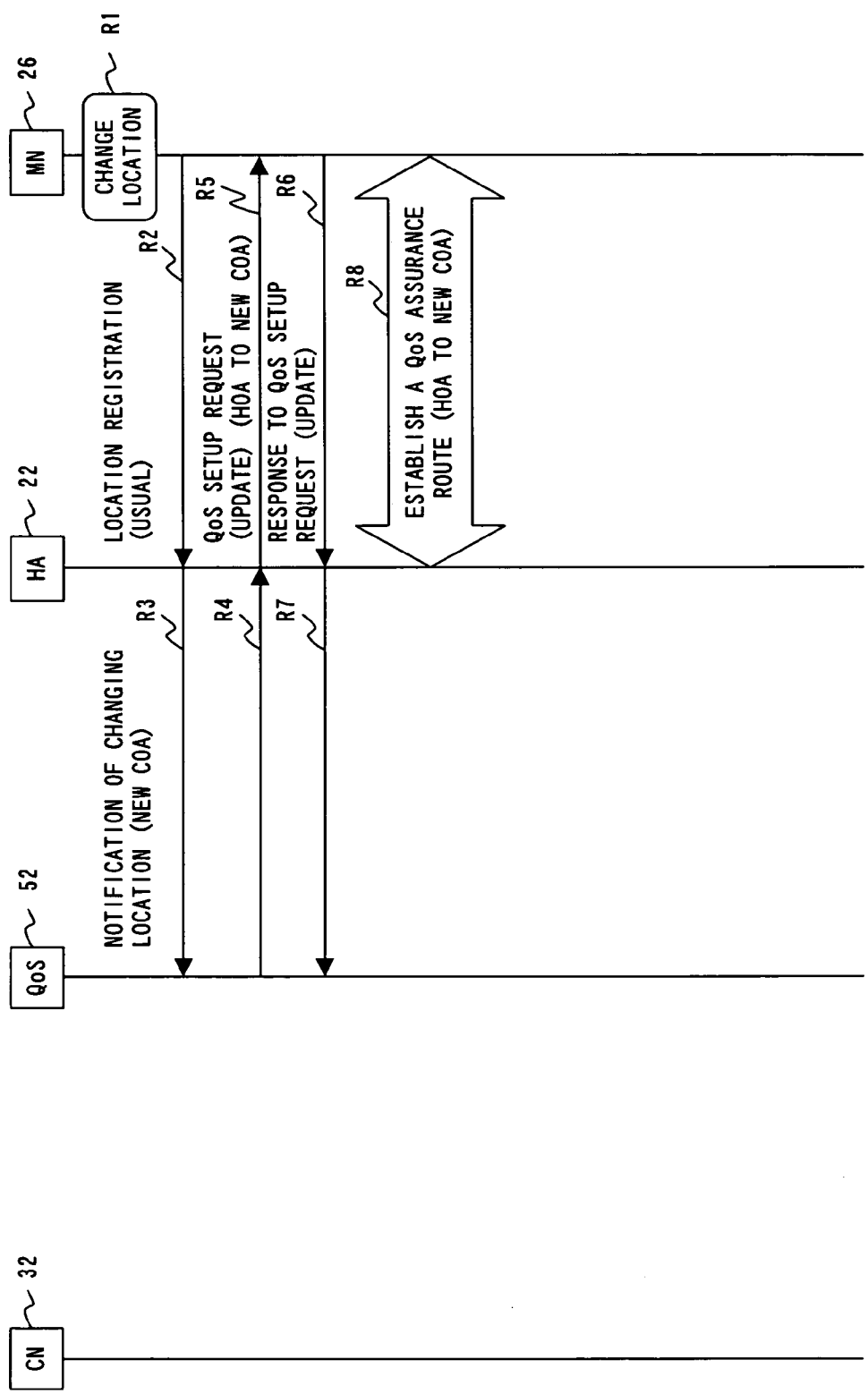
FIG. 31 describes a second sequence at the time of handover according to the first and second working examples shown by FIGS. 28 and 29, respectively.

FIG. 31 describes a second sequence at the time of handover according to the first and second working examples shown by FIGS. 28 and 29, respectively. The differences from FIG. 30 are that the HA 22 receives a usual position registration (i.e., update) at the HA 22 from the MN 26 (R2) and that the HA 22 notifies the QoS setup node 52 of the CoA being changed (R3). This saves one message as compared to the case of handover shown by FIG. 30.

Figure 32:
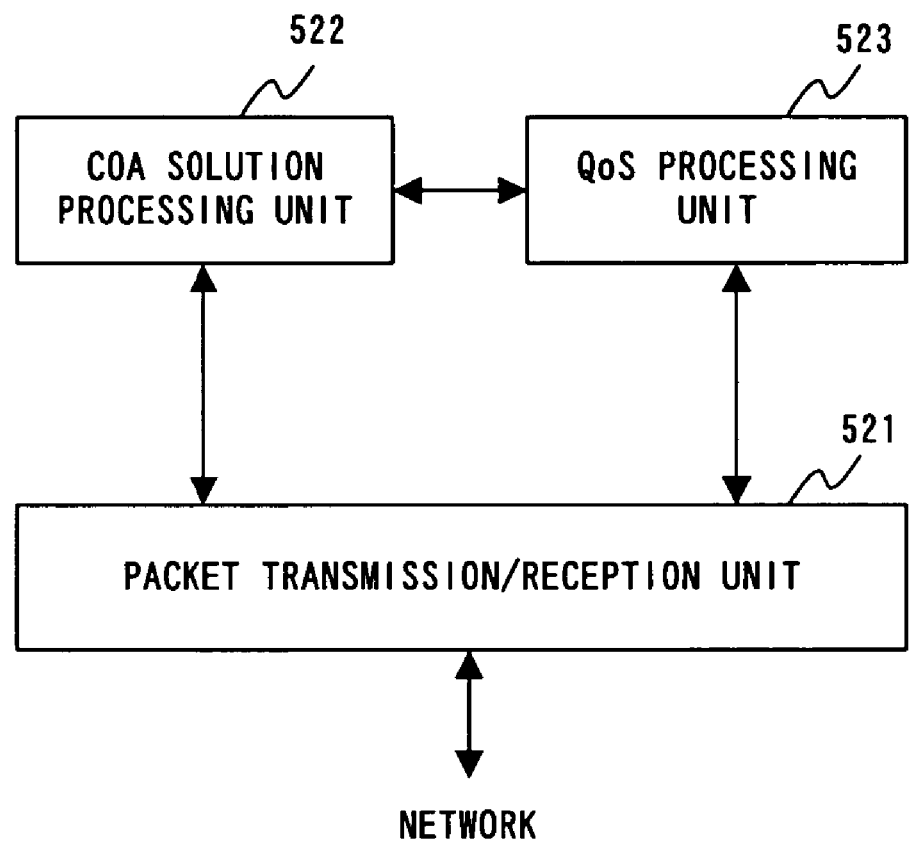
FIG. 32 is a functional block diagram showing a comprisal of a QoS setup node according to the third embodiment of the present invention.

FIG. 32 is a functional block diagram showing a comprisal of a QoS setup node according to the third embodiment of the present invention. The QoS setup node transmits and receives packets to and from the network by way of a packet transmission/reception unit 521. A QoS processing unit 523 controls network resources in the network such as routers and switches based on a QoS setup request, and also sends a second QoS setup request out to the network by way of the packet transmission/reception unit 521 when receiving a first QoS setup request by way of the packet transmission/reception unit 521. A CoA solution processing unit 522 queries the HA 22 in order to obtain the care of address CoA of the MN 26.

FIG. 33 is a flow chart for the QoS setup node according to the third embodiment of the present invention carrying out the sequence shown by FIG. 28. Describing it while referring to FIG. 32, as the packet transmission/reception unit 521 receives the first QoS setup request (1) (S41), the QoS processing unit 523 transmits a message to the HA 22 for obtaining a CoA so that the CoA solution processing unit 522 queries the HA 22 about the HoA of the MN 26 which is the addressee of the first QoS setup request (1) (S42). As the acquisition of CoA is confirmed (S43), the QoS processing unit 523 transmits the second QoS setup request (2) by way of the packet transmission/reception unit 521 (S44) and establish a QoS setup between the HoA and CoA when receiving a response to the second QoS setup request (2) (S45). Upon finishing the second QoS setup request (2), the QoS processing unit 523 transmits a response to the first QoS setup request (1) (S46).

FIG. 34 is a flow chart for the QoS setup node according to the third embodiment of the present invention carrying out the sequence shown by FIG. 29. Describing it while referring to FIG. 32, as the packet transmission/reception unit 521 receives a first QoS setup request (1) (S51), the QoS processing unit 523 transmits a response thereto (S52) and also transmits a message to the HA 22 for acquiring a CoA so that the CoA solution processing unit 522 queries the HA 22 about the HoA of the MN 26 which is the addressee of the first QoS setup request (1) (S52). As the acquisition of CoA is confirmed (S53), the QoS processing unit 523 transmits a second QoS setup request (2) by way of the packet transmission/reception unit 521 (S54) and carries out a QoS setup between the HoA and CoA when receiving a response to the second QoS setup request (2) (S55).

Making the QoS setup node applicable to the QoS setup method according to the present invention accomplishes mobile communication with a QoS assurance between the CN and MN without adding a function of route optimization to a large number of CNs existing in a network.

In addition, the present invention, not premised on route optimization as in the case of the conventional example shown by FIG. 1, does not require the MN to put a position registration on record at the CN prior to engaging in a communication as shown by the sequence in FIG. 2, which eliminates a message for the position registration, making it possible to save network resources and shorten the processing time. While the conventional example shown by FIGS. 1 and 2 has only one CN, the MN will conceivably communicate with a plurality thereof simultaneously. As the number of CNs with which the MN communicates increases, the position registration messages for route optimizations increase by the same amount, resulting in consuming network resources and increasing processing time. Whereas the method according to the present invention requires only one position registration message to the HA regardless of the number of CNs to be communicated with, hence saving network resources and shortening processing time greatly.

An application of the above described techniques according to the present invention will highly probably be used by telecommunications carriers or service providers providing a high quality communication service with QoS assurance in a mobile communication environment which connects to the Internet while switching various wireless access networks by using mobile terminals such as mobile phones, PDAs and mobile PCs.

What is claimed is:

1. A quality of service (QoS) setup method, comprising:
   recognizing a first QoS setup request, at a mobile node, the first QoS setup request relating to an opposite correspondent node and a first route between the opposite correspondent node and a home address of the mobile node,
   making a second QoS setup request, from the mobile node, for a second route between the home address and a Care-of Address of the mobile node, and
   establishing the second QoS setup for the second route.

2. A quality of service (QoS) setup system for use in a mobile internet protocol (IP) network, the system comprising:
   a mobile node to
   recognize a first QoS setup request, the first QoS setup request relating to an opposite correspondent node and a route between the opposite correspondent node and a home address of the mobile node, and establish a second QoS setup between a home agent or home network and the mobile node or a visited network.

3. The QoS setup system according to claim 2, wherein said mobile node makes a second QoS setup request to establish a route with a QoS setup between the home address of the mobile node and a Care-of Address of the mobile node prior to returning a response to the first QoS setup request.

4. The QoS setup system according to claim 2, wherein said mobile node makes a second QoS setup request to establish a route with a QoS setup between the home address of the mobile node and a Care-of Address of the mobile node approximately at the time of returning a response to the first QoS setup request.

5. The QoS setup system according to claim 2, wherein said mobile node updates a QoS setup only for a route between the home address of the mobile node and a new Care-of Address of the mobile node regardless of a number of opposite correspondent nodes when the mobile node changes a location and switches visited networks.

6. A mobile terminal apparatus, comprising:
a packet transmission/reception unit to transmit and receive a packet to and from a network;
a mobile internet protocol (IP) processing unit to register a position registration on record at a management node which manages a home address; and
a quality of service (QoS) processing unit to transmit a second QoS setup request out to the network when receiving a first QoS setup request, wherein
the first QoS setup request is for a first route between an opposite correspondent node and the home address, and
the second QoS setup request is for a second route between the home address and a Care-of address of the mobile node.

7. A quality of service (QoS) setup method, comprising:
recognizing a first QoS setup request, at a home agent, the first QoS setup request relating to an opposite correspondent node and a first route between the opposite correspondent node and a home address of a mobile node,
making a second QoS setup request, at the home agent, for a second route between the home address and a Care-of Address of the mobile node, and
establishing the second QoS setup for the second route.

8. A quality of service (QoS) setup system for use in a mobile internet protocol (IP) network, the system comprising:
a home agent to
recognize a first QoS setup request, the first QoS setup request relating to an opposite correspondent node and a route between the opposite correspondent node and a home address of a mobile node, and
establish a second QoS setup between the home agent or home network and the mobile node or a visited network.

9. The QoS setup system according to claim 8, wherein said home agent
makes a second QoS setup request to establish a route with a QoS setup between the home address of the mobile node and a Care-of Address of the mobile node prior to returning a response to the first QoS setup request.

10. The QoS setup system according to claim 8, wherein said home agent
makes a second QoS setup request to establish a route with a QoS setup between the home address of the mobile node and a Care-of Address of the mobile node approximately at the time of returning a response to the first QoS setup request.

11. The QoS setup system according to claim 8, wherein said home agent
updates a QoS setup only for a route between the home address of the mobile node and a new Care-of Address regardless of a number of opposite correspondent nodes when the mobile node changes a location and switches visited networks.

12. A home agent, comprising:
a packet transmission/reception unit to transmit and receive a packet to and from a network;
a binding cache to retain a correspondence relationship between a home address and a Care-of Address of a mobile node which has registered a position registration on record; and
a quality of service (QoS) processing unit to transmit a second QoS setup request out to the network when receiving a first QoS setup request, wherein
the first QoS setup request is for a first route between an opposite correspondent node and the home address, and
the second QoS setup request is for a second route between the home address and the Care-of address.

13. A quality of service (QoS) setup method performed by a server apparatus which carries out a QoS setup control for network resources, the method comprising:
recognizing a first QoS setup request, the first QoS setup request relating to an opposite correspondent node and a first route between the opposite correspondent node and a home address of a mobile node, and
making a second QoS setup request to carry out a QoS setup for a second route between the home address and a Care-of Address of the mobile node.

14. A quality of service (QoS) setup system for use in a mobile internet protocol (IP) network comprising:
a server apparatus to carry out a QoS setup control for network resources, wherein the server apparatus
recognizes a first QoS setup request, the first QoS setup request relating to an opposite correspondent node and a route between the opposite correspondent node and a home address of a mobile node, and
acquires a Care-of Address of the mobile node to carry out a second QoS setup between a home agent or home network and the mobile node or a visited network.

15. The QoS setup system according to claim 14, wherein said server apparatus
queries said home agent to obtain the Care-of Address of said mobile node, followed by making a second QoS setup request to establish a route with a QoS setup between the home address of the mobile node and the Care-of Address of the mobile node prior to returning a response to the first QoS setup request.

16. The QoS setup system according to claim 14, wherein said server apparatus
queries said home agent to obtain the Care-of Address of said mobile node, followed by making a second QoS setup request to establish a route with a QoS setup between the home address of the mobile node and the Care-of Address of the mobile node approximately at the time of returning a response to the first QoS setup request.

17. The QoS setup system according to claim 14, wherein said server apparatus
updates a QoS setup only for a route between the home address of the mobile node and a new Care-of Address regardless of a number of opposite correspondent nodes when the mobile node changes a location and switches visited networks.

18. A server apparatus which carries out a quality of service (QoS) setup control for network resources, comprising:
- a packet transmission/reception unit to transmit and receive a packet to and from a network;
- a Care-of Address solution processing unit to obtain a Care-of Address by querying a node which manages a mobile address; and
- a QoS processing unit to transmit a second QoS setup request out to the network when receiving a first QoS setup request, wherein
the first QoS setup request is for a first route between an opposite correspondent node and a home address of a mobile node, and
the second QoS setup request is for a second route between the home address and the Care-of address of the mobile node.

* * * * *